US011346447B2

(12) United States Patent
Nguyen et al.

(10) Patent No.: US 11,346,447 B2
(45) Date of Patent: May 31, 2022

(54) SEAL ASSEMBLY

(71) Applicant: SAINT-GOBAIN PERFORMANCE PLASTICS CORPORATION, Solon, OH (US)

(72) Inventors: Chien Nguyen, Barrington, RI (US); Xiang Yan, Barrington, RI (US); Van Duong, Corona, CA (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 104 days.

(21) Appl. No.: 16/447,996

(22) Filed: Jun. 21, 2019

(65) Prior Publication Data

US 2019/0390771 A1 Dec. 26, 2019

Related U.S. Application Data

(60) Provisional application No. 62/823,868, filed on Mar. 26, 2019, provisional application No. 62/689,714, filed on Jun. 25, 2018.

(51) Int. Cl.
 *F16J 15/02* (2006.01)
(52) U.S. Cl.
 CPC ................... *F16J 15/022* (2013.01)
(58) Field of Classification Search
 CPC .. F16J 15/00; F16J 15/022; F16J 15/02; F16J 15/021; F16J 15/08; F16J 15/46; F16J 15/48; F16J 15/025; F16J 15/027; F16J 15/028

USPC .......................................................... 277/619
See application file for complete search history.

(56) References Cited

U.S. PATENT DOCUMENTS

| 8,328,202 B2* | 12/2012 | Foster | F16J 15/3236 277/572 |
| 2009/0146379 A1* | 6/2009 | Foster | F16J 15/3236 277/307 |
| 2013/0043661 A1* | 2/2013 | Binder | F16J 15/3236 277/554 |

(Continued)

FOREIGN PATENT DOCUMENTS

JP  H01135268 U  9/1989

OTHER PUBLICATIONS

International Search Report for PCT/US2019/038364, dated Oct. 4, 2019, 13 pages.

*Primary Examiner* — Nathan Cumar
(74) *Attorney, Agent, or Firm* — Abel Schillinger, LLP; David G Miranda

(57) ABSTRACT

A seal assembly for high pressure equipment is disclosed and can include a back-up ring having a head and an extension extending from the head. The extension can include an interior surface that extends axially away from and radially inwardly from the head. The seal assembly can also include a spring energized seal having a jacket having a sealing portion with an annular spring disposed within the sealing portion of the jacket. At least a portion of the jacket fits around the extension of the back-up ring and wherein the back-up ring has a minimum inner diameter, $ID_{BUR}$, the spring energized seal has a minimum inner diameter, $ID_{SES}$, and $ID_{SES}$ is less than $ID_{BUR}$.

20 Claims, 13 Drawing Sheets

(56) References Cited

U.S. PATENT DOCUMENTS

2014/0210166 A1\* 7/2014 Balsells ................ F16J 15/322
                                                                 277/562
2016/0223086 A1\* 8/2016 Balsells ............... F16J 15/3208

\* cited by examiner

SEAL ASSEMBLY

CROSS-REFERENCE TO RELATED APPLICATION(S)

This application claims priority under 35 U.S.C. § 119(e) to U.S. Provisional Patent Application No. 62/823,868, entitled "SEAL ASSEMBLY", by Chien NGUYEN et al., filed Mar. 26, 2019, and this application claims priority under 35 U.S.C. § 119(e) to U.S. Provisional Patent Application No. 62/689,714, entitled "SEAL ASSEMBLY", by Chien NGUYEN et al., filed Jun. 25, 2018, both of which are assigned to the current assignee hereof and incorporated herein by reference in their entireties.

FIELD OF THE DISCLOSURE

The present invention relates, in general, to spring energized seals and spring energized seals for high pressure equipment such as pumps, intensifiers, boosters, generators, and actuators.

BACKGROUND

High pressure equipment is necessary in certain applications which generate, contain, and apply high pressure. For example, ultra-high performance liquid chromatography can be used to separate, identify, and quantify each component in a liquid mixture. A high pressure pump can force a pressurized liquid solvent containing a sample mixture through a column filled with a solid adsorbent material. Each component in the sample mixture may interact differently with the adsorbent material which can cause different flow rates for each of the different components in the sample mixture. This can lead to the separate of the individual components as they flow out of the column.

The industry continues to demand improved seals, particularly for applications utilizing higher operating pressures.

BRIEF DESCRIPTION OF THE DRAWINGS

The present disclosure may be better understood, and its numerous features and advantages made apparent to those skilled in the art by referencing the accompanying drawings.

DETAILED DESCRIPTION

The following is generally directed to seal assemblies that may be used in high pressure pumps, for example pumps used in ultra-high performance liquid chromatography systems. In one aspect, a seal assembly can include a spring energized seal and a back-up ring. The seal assembly is designed to allow the back-up ring to move radially within the spring energized seal during assembly so that the creation of particles due to manufacturing tolerances of a shaft inserted therethrough is minimized. Further, the design of the seal can substantially minimize contact with the seal assembly with the shaft to reduce the excessive wear risk of the seal assembly, e.g., contact with the back-up ring and contact with the spring energized seal outside of a sealing portion of a jacket of the spring energized seal.

Figure 1:
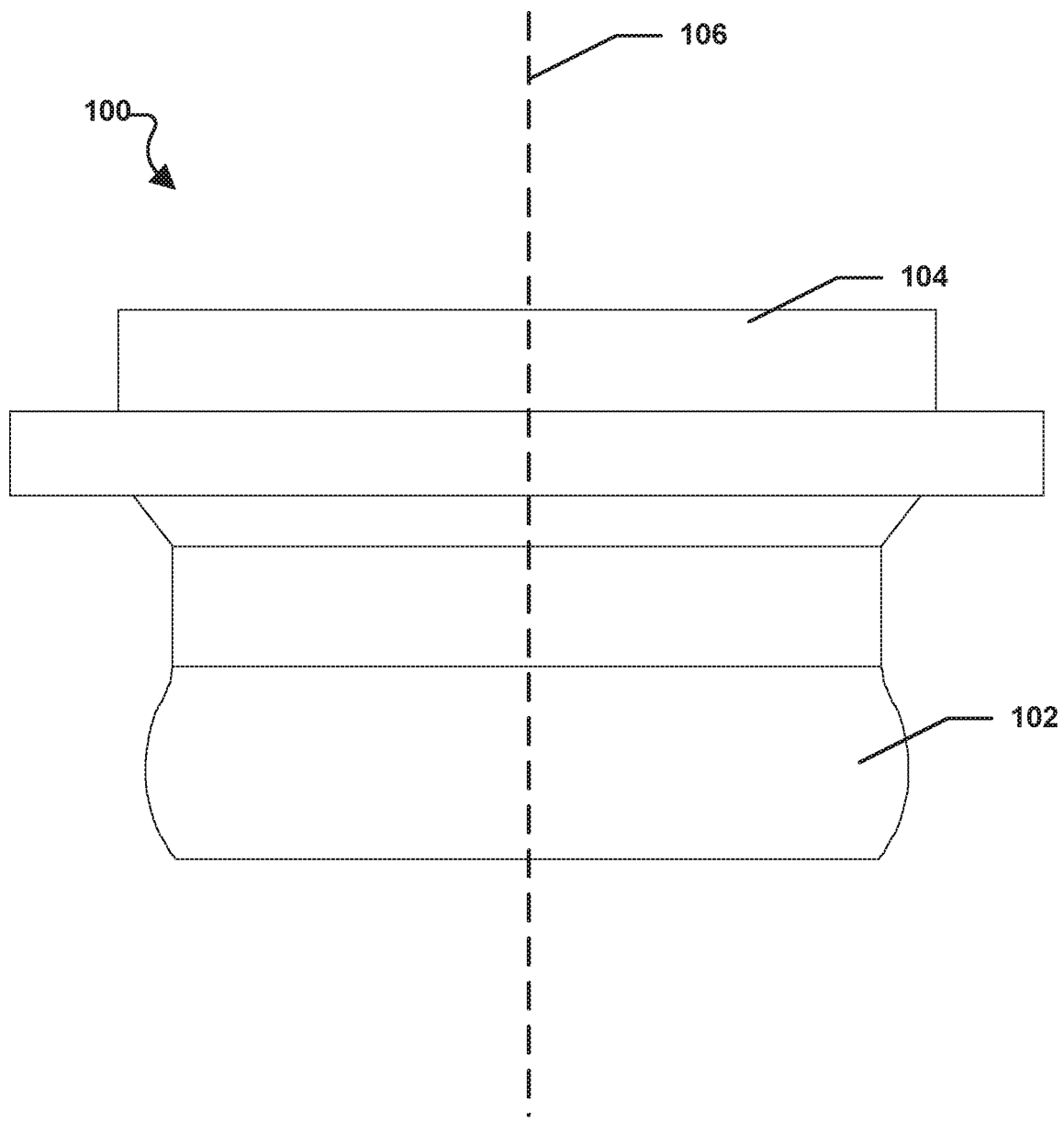
FIG. 1 includes an illustration of a side plan view of a seal assembly in accordance with an embodiment.
Figure 2:
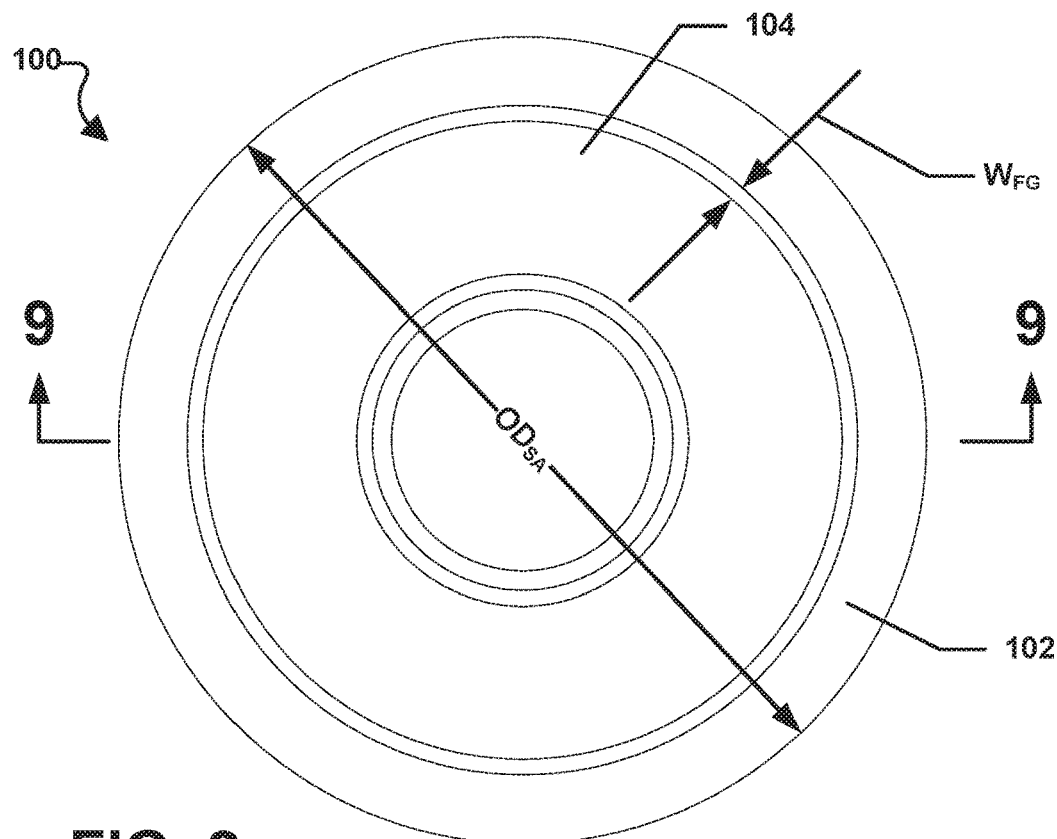
FIG. 2 includes an illustration of a top plan view of a seal assembly in accordance with an embodiment.
Figure 3:
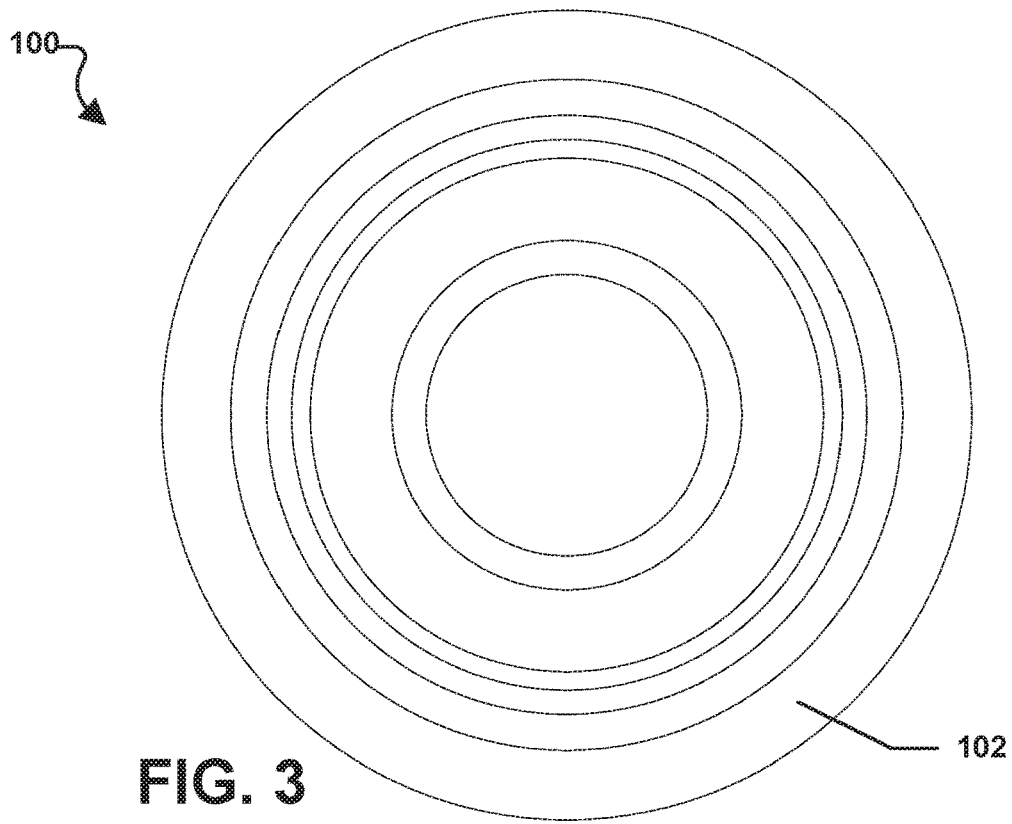
FIG. 3 includes an illustration of a bottom plan view of a seal assembly in accordance with an embodiment.

Referring initially to FIG. 1 through FIG. 3, a seal assembly is illustrated and is generally designated 100. As shown, the seal assembly can include a spring energized seal 102 and a back-up ring 104. In a particular aspect, and as described in greater detail below, the back-up ring 104 fits at least partially within the spring energized seal 102. The seal assembly 100 can define a longitudinal axis 106.

As shown in FIG. 4 through FIG. 8, the spring energized seal 102 can include a jacket 108 having a body 110 and the body 110 of the jacket 108 can include a first end 112 and a second end 114. Further, the body 110 can include a head 116 that is formed on the body 110 adjacent to, or near, the first end 112 of the body 110. Moreover, the body 110 of the jacket 108 can include an extension 118 that can extend away from the head 116 in a direction substantially parallel to the longitudinal axis 106.

Figure 4:
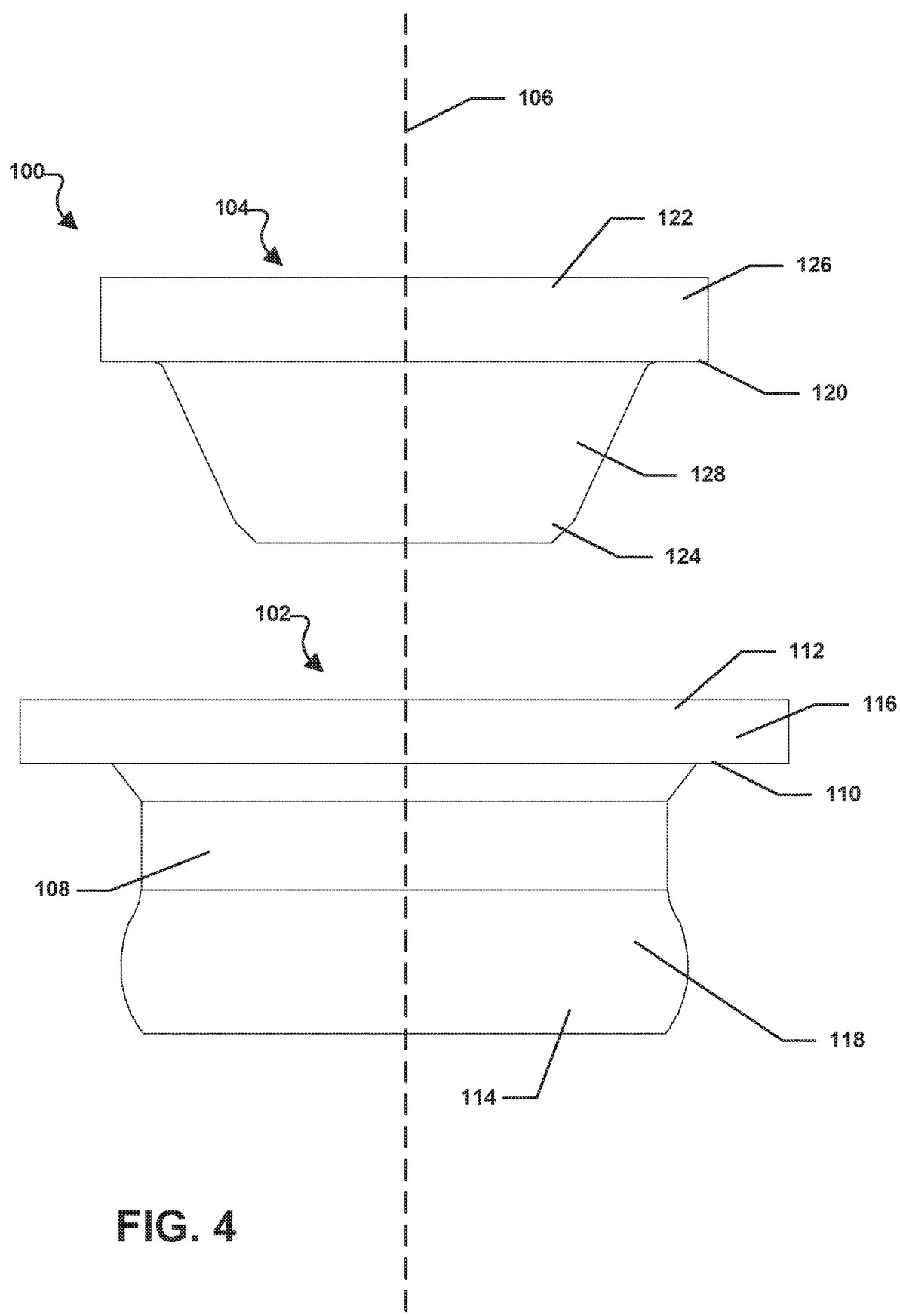
FIG. 4 includes an illustration of an exploded side plan view of a seal assembly in accordance with an embodiment.
Figure 5:
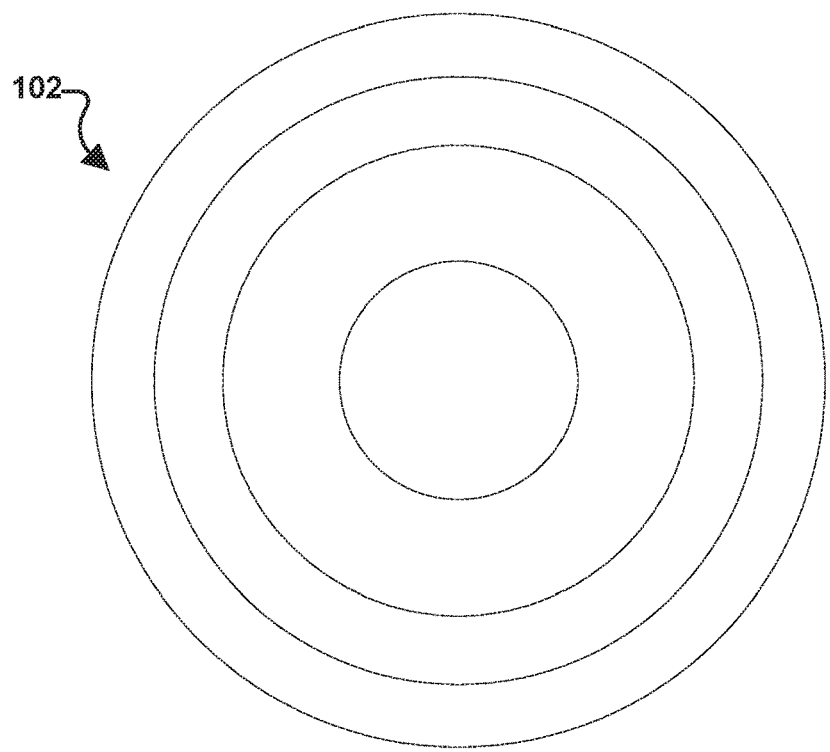
FIG. 5 includes an illustration of a top plan view of a back-up ring for a seal assembly in accordance with an embodiment.
Figure 6:
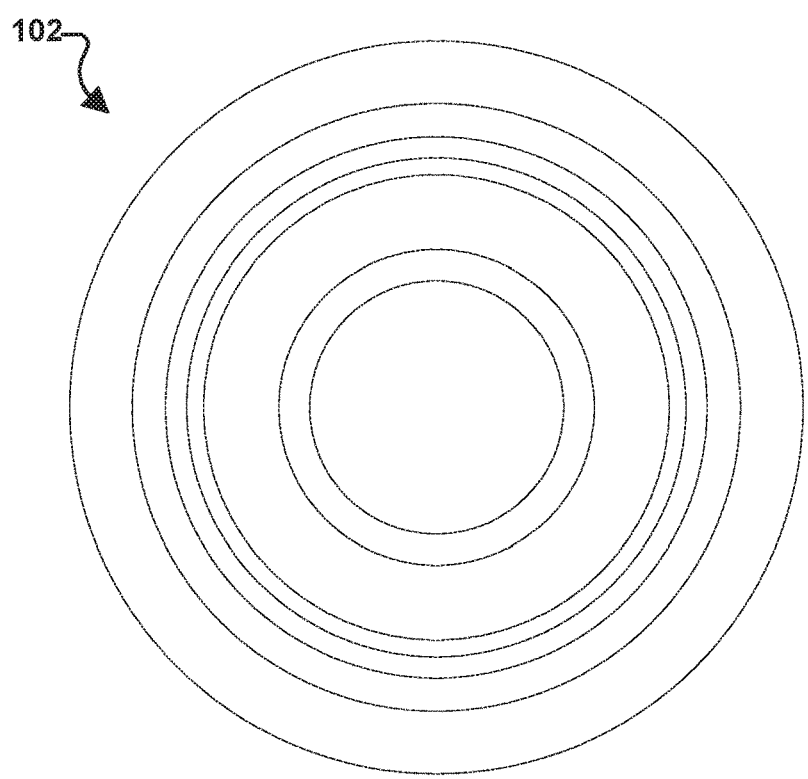
FIG. 6 includes an illustration of a bottom plan view of a back-up ring for seal assembly in accordance with an embodiment.
Figure 7:
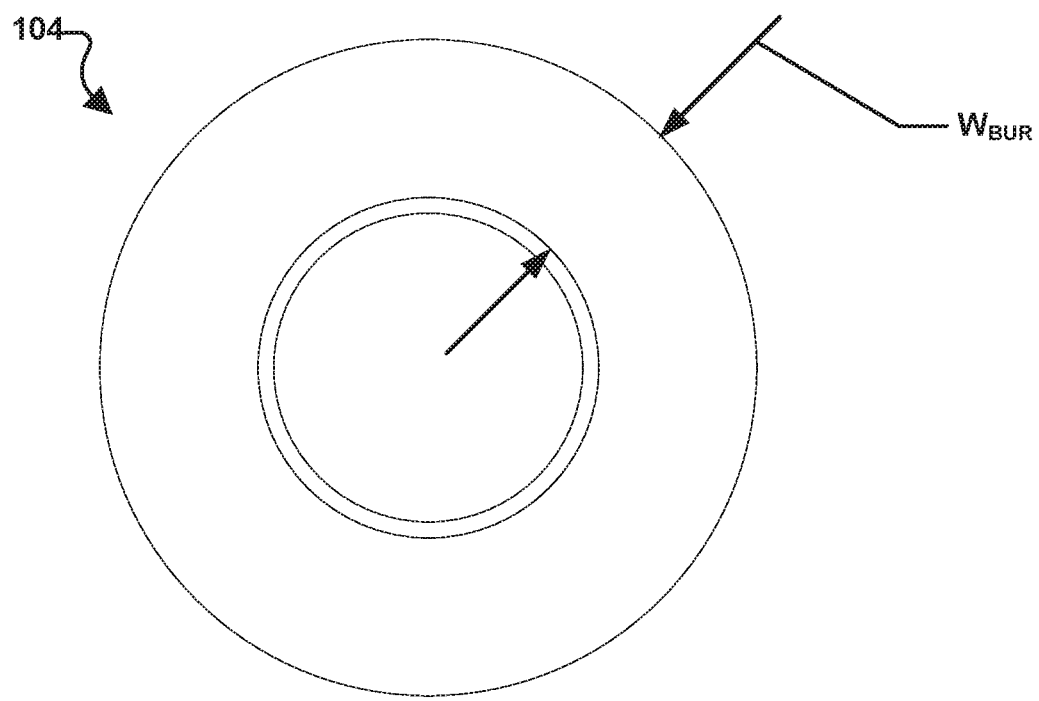
FIG. 7 includes an illustration of a top plan view of a spring energized seal for a seal assembly in accordance with an embodiment.
Figure 8:
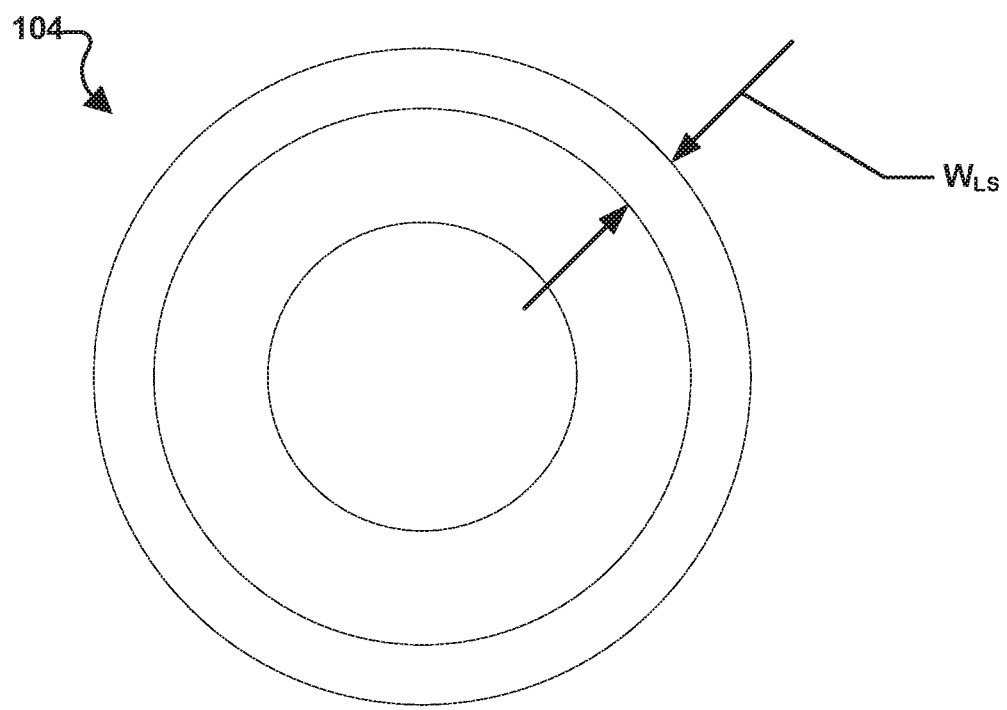
FIG. 8 includes an illustration of a bottom plan view of a spring energized seal for a seal wheel assembly in accordance with an embodiment.

FIG. 4 also shows that the back-up ring 104 can include a body 120 that includes a first end 122 and a second end 124. The body 120 can include a head 126 that is formed on the body 120 adjacent to, or near, the first end 122 of the body 120. Additionally, the body 120 can include an extension 128 that can extend away from the head 126 in a direction substantially parallel to the longitudinal axis 106. In a particular aspect, the extension 128 of the back-up ring 104 can be generally frustoconical in shape.

Figure 9:
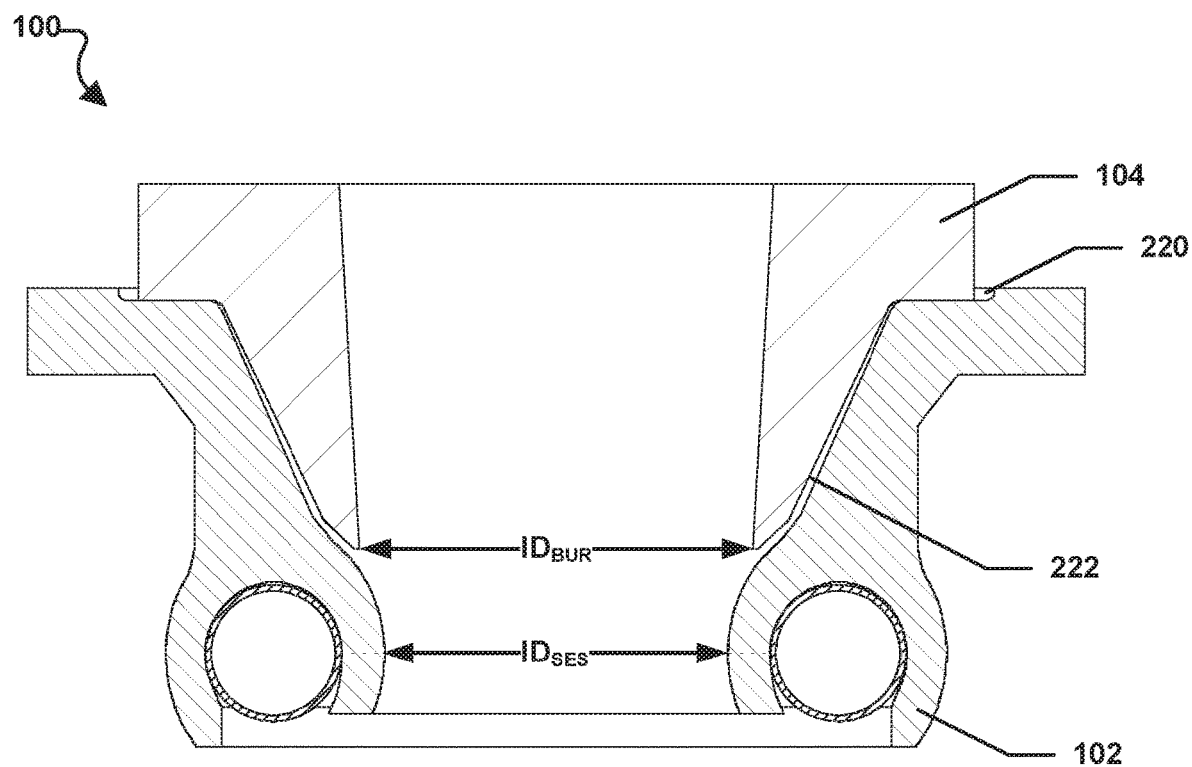
FIG. 9 includes an illustration of a cross-section view, taken along Line 9-9 in FIG. 2, of a seal assembly in accordance with an embodiment.
Figure 10:
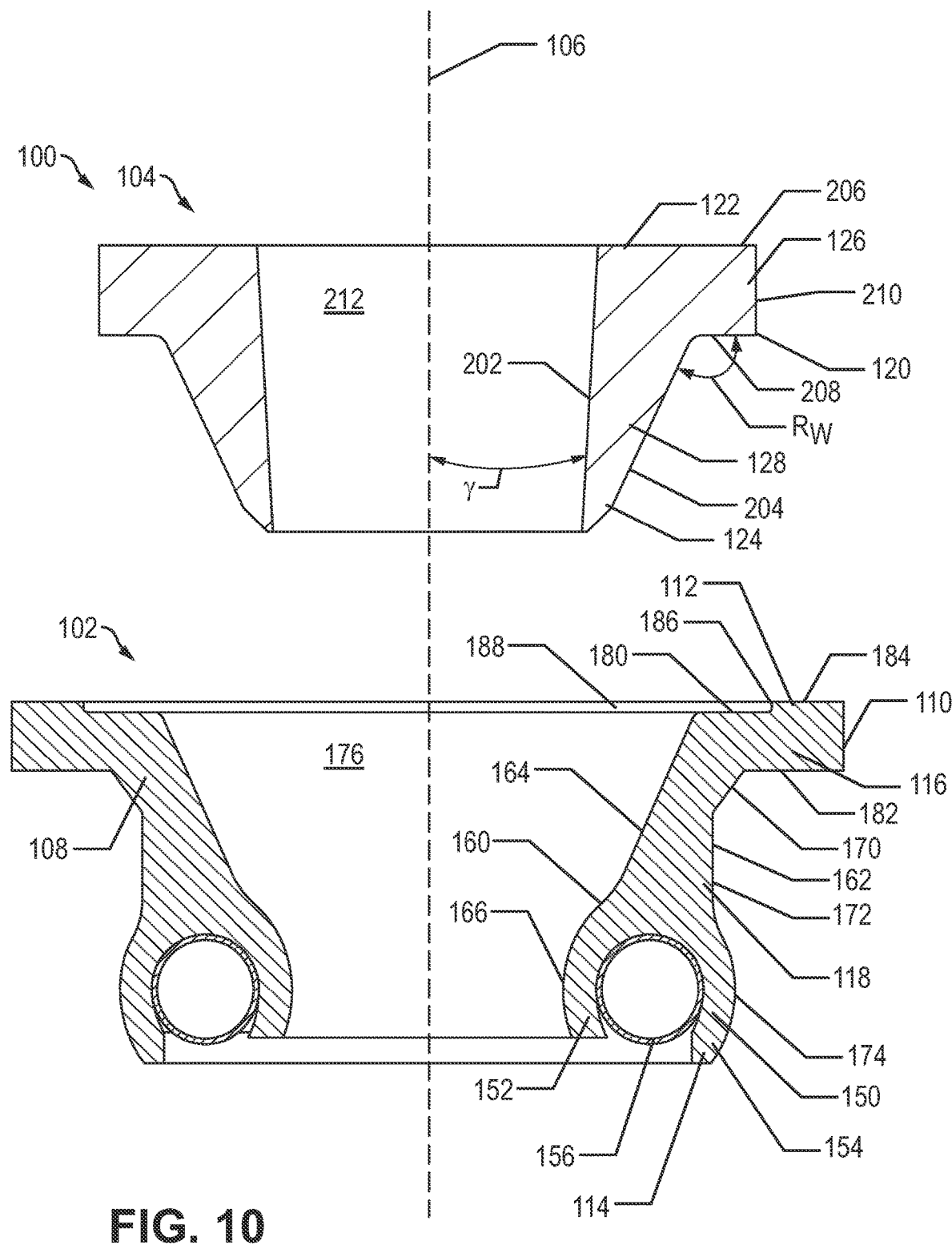
FIG. 10 includes an illustration of a cross-section and exploded view of a seal assembly in accordance with an embodiment.
Figure 11:
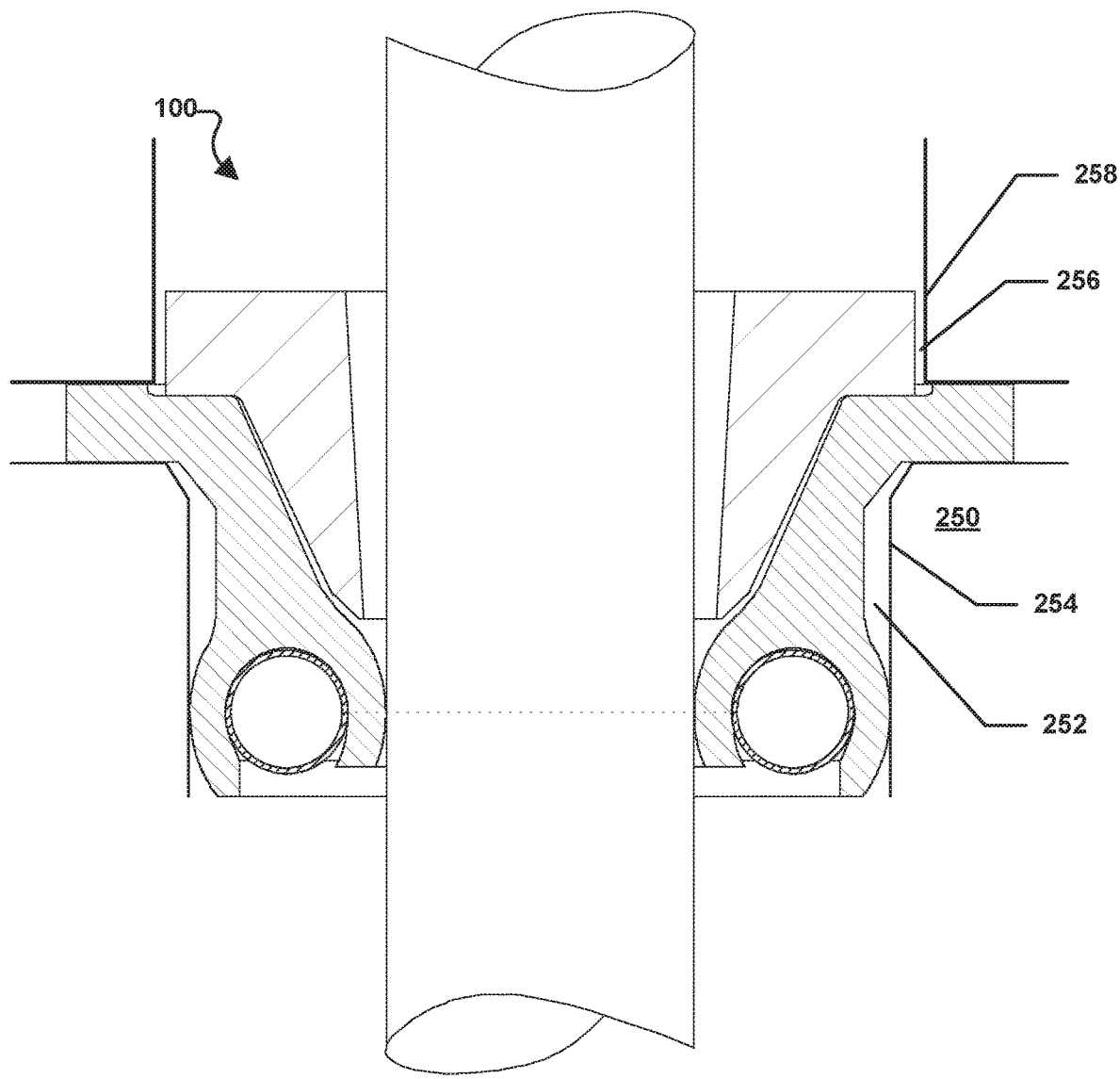
FIG. 11 includes an illustration of a cross-section and exploded view of a seal assembly in accordance with an embodiment.

Referring now to FIG. 9 through FIG. 11, further details concerning the spring energized seal 102 and the back-up ring 104 are shown. As illustrated, the extension 118 of the body 110 of the spring energized seal 102 can include a sealing portion 150 formed at the second end 114 of the body 110. The sealing portion 150 can include an inner extension portion 152 and an outer extension portion 154. Further, the sealing portion 150 can include an annular spring pocket 151 formed between the inner extension portion 152 and the outer extension portion 154. The spring energized seal 102 can further include an annular spring 156 disposed within the annular spring pocket 151.

In a particular aspect, the spring energized seal 102 can have a minimum inner diameter, $ID_{SES}$, which is measured at the narrowest part of the inner bore formed in the spring energized seal 102. Further, the back-up ring 104 can include a minimum inner diameter, $ID_{BUR}$, which is measured at the narrowest part of the inner bore formed in the back-up ring 104. In a particular aspect, $ID_{SES}$ can be less than or equal to 99% $ID_{BUR}$. Moreover, $ID_{SES}$ can be less than or equal to 98% $ID_{BUR}$, such as less than or equal to 97% $ID_{BUR}$, less than or equal to 96% $ID_{BUR}$, or less than or equal to 95% $ID_{BUR}$. In another aspect, $ID_{SES}$ can be greater than or equal to 85% $ID_{BUR}$, such as greater than or equal to 90% $ID_{BUR}$, greater than or equal to 91% $ID_{BUR}$, greater than or equal to 92% $ID_{BUR}$, greater than or equal to 93% $ID_{BUR}$, or greater than or equal to 94% $ID_{BUR}$. It is to be understood that $ID_{SES}$ can be within a range between, and including, any of the maximum or minimum values of $ID_{SES}$ described herein.

FIG. 9 through FIG. 11 further indicate that the body 110 of the spring energized seal 102 can further include an interior surface 160 and an exterior surface 162. The interior surface 160 can extend from the first end 112 of the body 110 to the second end of the body 114 and can include a first portion 164 that can extend at an angle, α, with respect to the longitudinal axis 106 of the seal assembly 100. In a particular aspect, a can be greater than or equal to 10°. Further, a can be greater than or equal to 12.5°, such as greater than or equal to 15°, greater than or equal to 17.5°, or greater than or equal to 20°. In another aspect, α can be less than or equal to 30°, such as less than or equal to 27.5°, less than or equal to 25°, or less than or equal to 22.5°. It is to be understood that α can be within a range between, and including, any of the minimum and maximum values of α described herein.

The first portion 164 can extend at least partially along the interior surface 160 of the extension 118 and terminate at a second portion 166 that is curved. The second portion 166 can terminate at the second end 114 of the extension 118. Further, the exterior surface 162 of the extension 118 can include a first portion 170 that can extend at an angle, β, with respect to the longitudinal axis 106 of the seal assembly 100. In a particular aspect, β can be greater than or equal to 10°. Further, β can be greater than or equal to 15°, such as greater than or equal to 20°, greater than or equal to 25°, or greater than or equal to 30°. In another aspect, β can be less than or equal to 50°, such as less than or equal to 47.5°, less than or equal to 45°, or less than or equal to 42.5°. It is to be understood that β can be within a range between, and including, any of the minimum and maximum values of β described herein.

The first portion 170 can extend at least partially along the exterior surface 162 of the extension 118 until it reaches a second portion 172. The second portion 172 of the exterior surface can be substantially parallel to the longitudinal axis 106 of the seal assembly 100. The second portion 172 of the exterior surface can extend to a third portion 174 of the exterior surface 162 of the extension 118. The third portion 174 of the exterior surface 162 can be curved and can terminate at the second end 114 of the extension 118. As illustrated, a frustoconical bore 176 can be formed within the body 110 and can be bound by the first portion 164 of the interior surface 160 of the body 110.

FIG. 9 through FIG. 11 also show that the head 116 of the body 110 of the jacket 108 of the spring energized seal 102 can include an upper surface 180 and a lower surface 182. The upper surface 180 and lower surface 182 of the head 116 of the body 110 of the jacket 108 of the spring energized seal 102 can be substantially perpendicular to the longitudinal axis 106 of the seal assembly 100. Further, a lip 184 can extend from the upper surface 180 of the head 116 of the body 110 in a direction opposite the extension 118. The lip 184 can include an interior surface 186 and a shallow depression 188 can be bound by the interior surface 186 of the lip 184. In a particular aspect, the shallow depression 188 can have a height, $H_{SD}$, and the head 116 of the body 110 of the jacket 108 of the spring energized seal 102 can have a height, $H_H$. $H_{SD}$ can be less than or equal to 20% $H_H$. Further, $H_{SD}$ can be less than or equal to 17.5% $H_H$, such as less than or equal to 15% $H_H$, or less than 12.5% $H_H$. Further, $H_{SD}$ can be greater than or equal to 5% $H_H$, such as greater than or equal to 7.5% $H_H$, or greater than or equal to 10.0% $H_H$. It is to be understood that $H_{SD}$ can be within a range between, and including, any of the maximum and minimum values of $H_{SD}$ described herein.

FIG. 9 through FIG. 11 also indicate that the body 120 of the back-up ring 104 can include an interior surface 202 that can extend from the first end 122 of the body 120 to the second end 124 of the body 120. Further, the extension 128 of the body 120 of the back-up ring 104 can include an exterior surface 204 that can extend from the head 126 of the body 120 to the second end 124 of the body 120. In a particular aspect, the interior surface 202 of the body 120 of the back-up ring 104 can be formed at an angle, γ, with respect to the longitudinal axis 106.

In a particular aspect, γ can be greater than or equal to 0.25°. Further, γ can be greater than or equal to 0.5°, such as greater than or equal to 0.75°, greater than or equal to 1.0°, greater than or equal to 1.5°, greater than or equal to 2.0°, greater than or equal to 2.5°, or greater than or equal to 3°. In another aspect, γ can be less than or equal to 10°, such as less than or equal to 7.5°, less than or equal to 5.0°, or less than or equal to 3.5°. It is to be understood that γ can be within a range between, and including, any of the minimum and maximum values of γ described herein.

The exterior surface 204 of the body 120 of the back-up ring 104 can also be formed at an angle, δ, with respect to the longitudinal axis 106. In a particular aspect, δ can be greater than or equal to 10°. Further, δ can be greater than or equal to 12.5°, such as greater than or equal to 15°, greater than or equal to 17.5°, or greater than or equal to 20°. In another aspect, δ can be less than or equal to 30°, such as less than or equal to 27.5°, less than or equal to 25°, or less than or equal to 22.5°. It is to be understood that δ can be within a range between, and including, any of the minimum and maximum values of δ described herein.

FIG. 9 through FIG. 11 show that the head 126 of the body 120 of the back-up ring 104 can include an upper surface 206 and a lower surface 208 and an exterior surface 210. Moreover, a frustoconical bore 212 can be formed within the body 120 of the back-up ring 104. The frustoconical bore 212 within the body 120 of the back-up ring 104 can be bound by the interior surface 202 of the body 120 of the back-up ring 104.

When the back-up ring 104 is installed within the spring energized seal 102, as depicted in FIG. 9, the back-up ring 104 can extend at least partially into the spring energized seal 102. Specifically, the frustoconical extension 128 of the body 120 of the back-up ring 104 can fit into the frustoconical bore 176 formed in the body 110 of the jacket 108 of the spring energized seal 102. As shown, when the back-up ring 104 is installed within the spring energized seal 102, there is a first gap 220 that can be established around the head 126 of the body 120 of the back-up ring 104. Specifically, the first gap 220 can be established between the exterior surface 210 of the head 126 of the body 120 of the back-up ring 104 and the interior surface 186 of the lip 184 that extends from the head 116 of the body 110 of the jacket 108 of the spring energized seal 102.

Referring briefly to FIG. 2, the seal assembly 100 can have an outer diameter, $OD_{SA}$, and the first gap 220 can have a width, $W_{FG}$, and $W_{FG}$ can be less than or equal to 5% $OD_{SA}$. Further, $W_{FG}$ can be less than or equal to 4% $OD_{SA}$, such as less than or equal to 3% $OD_{SA}$, less than or equal to 2% $OD_{SA}$, or less than or equal to 1% $OD_{SA}$. In another aspect, $W_{FG}$ can be greater than or equal to 0.1% $OD_{SA}$, such as greater than or equal to 0.2% $OD_{SA}$, greater than or equal to 0.3% $OD_{SA}$, greater than or equal to 0.4% $OD_{SA}$, greater than or equal to 0.5% $OD_{SA}$, greater than or equal to 0.6% $OD_{SA}$, greater than or equal to 0.7% $OD_{SA}$, greater than or equal to 0.8% $OD_{SA}$, or greater than or equal to 0.9% $OD_{SA}$. It is to be understood that $W_{FG}$ can be within a range between, and including, any of the maximum and minimum values of $W_{FG}$ described herein.

In another aspect, $OD_{SA}$ can be less than or equal to 20.0 mm. Moreover, $OD_{SA}$ can be less than or equal to 17.5 mm, such as less than or equal to 15.0 mm, less than or equal to 12.5 mm, or less than or equal to 10.0 mm. In another aspect, $OD_{SA}$ can be greater than 2.5 mm, such as greater than 5.0 mm or greater than 7.5 mm. It is to be understood that $OD_{SA}$ can be within a range between, and including, any of the maximum and minimum values of $OD_{SA}$ described herein. In still another aspect, $W_{FG}$ can be less than or equal to 0.1 mm. Further, $W_{FG}$ can be less than or equal to 0.095 mm, such as less than or equal to 0.09 mm, less than or equal to 0.085 mm, less than or equal to 0.08 mm, less than or equal to 0.075 mm, less than or equal to 0.07 mm, less than or equal to 0.065 mm, or less than or equal to 0.06 mm. In another aspect, $W_{FG}$ can be greater than or equal to 0.01 mm, such as greater than or equal to 0.015 mm, greater than or equal to 0.02 mm, greater than or equal to 0.025 mm, greater than or equal to 0.03 mm, greater than or equal to 0.035 mm, greater than or equal to 0.04 mm, greater than or equal to 0.045 mm, or greater than or equal to 0.05 mm. It is to be understood that $W_{FG}$ can be within a range between, and including, any of the maximum and minimum values of $W_{FG}$ described herein.

Referring back to FIG. 9, when the back-up ring 104 is installed within the spring energized seal 102, a second gap 222 can be established around the extension 128 of the body 120 of the back-up ring 104 between the exterior surface 204 of the extension 128 of the body 120 of the back-up ring 104 and the first portion 164 of the interior surface 160 of the body 110 of the jacket 108 of the spring energized seal 102. The second gap 222 can extend at least partially along the length, $L_{ES}$, of the exterior surface 204 of extension 128 of the body 120 of the back-up ring 104. For example, the second gap 222 can have a gap length, $L_G$, and $L_G$ can be less than or equal to 100% $L_{ES}$. Further, $L_G$ can be less than or equal to 95% $L_{ES}$, such as less than or equal to 90% $L_{ES}$, less than or equal to 85% $L_{ES}$, less than or equal to 80% $L_{ES}$, or less than or equal to 75% $L_{ES}$. In another aspect, $L_G$ can be greater than or equal to 10% $L_{ES}$, such as greater than or equal to 15% $L_{ES}$, greater than or equal to 20% $L_{ES}$, greater than or equal to 25% $L_{ES}$, greater than or equal to 30% $L_{ES}$, greater than or equal to 35% $L_{ES}$, greater than or equal to 40% $L_{ES}$, greater than or equal to 45% $L_{ES}$, or greater than or equal to 50% $L_{ES}$. It is to be understood that $L_G$ can be within a range between, and including, any of the maximum and minimum values of $L_G$ described herein.

The second gap 222 can also have a maximum gap width, $W_{SG}$, measured through the widest portion of the second gap 222. $W_{SG}$ can be less than or equal to 0.1 mm. Further, $W_{SG}$ can be less than or equal to 0.095 mm, such as less than or equal to 0.09 mm, less than or equal to 0.085 mm, less than or equal to 0.08 mm, less than or equal to 0.075 mm, less than or equal to 0.07 mm, less than or equal to 0.065 mm, or less than or equal to 0.06 mm. In another aspect, $W_{SG}$ can be greater than or equal to 0.01 mm, such as greater than or equal to 0.015 mm, greater than or equal to 0.02 mm, greater than or equal to 0.025 mm, greater than or equal to 0.03 mm, greater than or equal to 0.035 mm, greater than or equal to 0.04 mm, greater than or equal to 0.045 mm, or greater than or equal to 0.05 mm. It is to be understood that $W_{SG}$ can be within a range between, and including, any of the maximum and minimum values of $W_{SG}$ described herein.

In a particular aspect, the body 110 of the jacket 108 of the sealing assembly can include a maximum width, $W_{MB}$, measured radially through the sealing portion 150 of the body 110 of the jacket 108 of the spring energized seal 102. $W_{SG}$ can be less than or equal to 15% $W_{MB}$. Further, $W_{SG}$ can be less than or equal to 12.5% $W_{MB}$, such as less than or equal to 10% $W_{MB}$, less than or equal to 7.5% $W_{MB}$, or less than or equal to 5% $W_{MB}$. In another aspect, $W_{SG}$ can be greater than or equal to 1% $W_{MB}$, such as greater than or equal to 1.5% $W_{MB}$, greater than or equal to 2% $W_{MB}$, greater than or equal to 2.5% $W_{MB}$, or greater than or equal to 3% $W_{MB}$. It is to be understood that $W_{SG}$ can be within a range between, and including, any of the values of $W_{SG}$ described herein.

As shown in FIG. 11, when the seal assembly 100 is installed within a housing 250, a third gap 252 can be established around the extension 118 of the body 110 of the jacket 108 of the seal assembly 100. Specifically, the third gap 252 can be established between the exterior surface 162 of the extension 118 of the body 110 of the jacket 108 of the seal assembly 100 and an interior surface 254 of the housing 250. The third gap 252 can have a maximum gap width, $W_{TG}$, measured through the widest part of the third gap 252. $W_{TG}$ can be less than or equal to 0.5 mm. Further, $W_{TG}$ can be less than or equal to 0.45 mm, such as less than or equal to 0.4 mm, less than or equal to 0.35 mm, less than or equal to 0.3 mm, less than or equal to 0.25 mm, less than or equal to 0.2 mm, less than or equal to 0.15 mm, less than or equal to 0.1 mm, or less than or equal to 0.05 mm. In another aspect, $W_{TG}$ can be greater than or equal to 0.01 mm, such as greater than or equal to 0.015 mm, greater than or equal to 0.02 mm, greater than or equal to 0.025 mm, greater than or equal to 0.03 mm, greater than or equal to 0.035 mm, greater than or equal to 0.04 mm, greater than or equal to 0.045 mm, or greater than or equal to 0.05 mm. It is to be understood that $W_{TG}$ can be within a range between, and including, any of the maximum and minimum values of $W_{TG}$ described herein.

In another aspect, $W_{TG}$ can be less than or equal to 20% $W_{MB}$. Further, $W_{TG}$ can be less than or equal to 17.5% $W_{MB}$, such as less than or equal to 15% $W_{MB}$, less than or equal to 12.5% $W_{MB}$, less than or equal to 10% $W_{MB}$, less than or equal to 7.5% $W_{MB}$, or less than or equal to 5% $W_{MB}$. In another aspect, $W_{TG}$, can be greater than or equal to 1% $W_{MB}$, such as greater than or equal to 1.5% $W_{MB}$, greater than or equal to 2% $W_{MB}$, greater than or equal to 2.5% $W_{MB}$, or greater than or equal to 3% $W_{MB}$. It is to be understood that $W_{TG}$ can be within a range between, and including, any of the values of $W_{TG}$ described herein.

Additionally, when the seal assembly 100 is installed within the housing 250, a fourth gap 256 can be established around the head 126 of the back-up ring 104 and the housing 250. The fourth gap 256 can have a gap width, $W_{FOG}$, measured radially through the fourth gap 256 from the exterior surface 210 of the head 126 of the back-up ring 104 to an upper interior surface 258 of the housing 250. In a particular aspect, $W_{FOG}$ can be less than or equal to 0.1 mm. Further, $W_{FOG}$ can be less than or equal to 0.095 mm, such as less than or equal to 0.09 mm, less than or equal to 0.085 mm, less than or equal to 0.08 mm, less than or equal to 0.075 mm, less than or equal to 0.07 mm, less than or equal to 0.065 mm, or less than or equal to 0.06 mm. In another aspect, $W_{FOG}$ can be greater than or equal to 0.01 mm, such as greater than or equal to 0.015 mm, greater than or equal to 0.02 mm, greater than or equal to 0.025 mm, greater than or equal to 0.03 mm, greater than or equal to 0.035 mm, greater than or equal to 0.04 mm, greater than or equal to 0.045 mm, or greater than or equal to 0.05 mm. It is to be understood that $W_{FOG}$ can be within a range between, and including, any of the maximum and minimum values of $W_{FOG}$ described herein.

It can be appreciated that the first gap and the fourth gap are adapted to allow the back-up ring to move in any radial direction relative to the spring energized seal while a shaft is inserted into through the seal assembly. Further, contact with the back-up ring is minimized after installation of the seal assembly and prior to pumping. Contact with the jacket of the spring energized seal assembly is also minimized outside of a sealing portion of the spring energized seal assembly. The second gap and the third gap are adapted to allow the jacket and seal to move with respect to the back-up ring as the shaft reciprocates. The size and shapes of the second gap and third gap allow the spring within the jacket to move slightly as the shaft reciprocates in the direction of travel with the shaft while maintaining the sealing portion of the jacket around the spring in proper contact with the shaft and the housing and maintaining the spring in proper alignment within the seal assembly.

In one aspect, the back-up ring can comprise a polymer, a polymer composite, an alloy, a ceramic, or a combination thereof. Further, the back-up ring can comprise a polyaryletherketone (PAEK). In particular, the back-up ring can comprise polyether-ether-ketone (PEEK). In another aspect, the jacket of the spring energized seal can comprise a polymer. In a particular aspect, the jacket of the spring energized seal can comprise polytetrafluoroethylene (PTFE), ultrahigh molecular weight polyethylene (UHMWPE), or a derivative thereof.

The seal assembly is adapted to withstand a pressure of greater than or equal to 5,000 psi. The pressure can be greater than or equal to 7,500 psi, such as greater than or equal to 10,000 psi, greater than or equal to 12,500 psi, or greater than or equal to 15,000 psi. Additionally, the pressure can be less than or equal to 30,000 psi, such as less than or equal to 27,500 psi, less than or equal to 25,000 psi, less than or equal to 22,500 psi, or less than or equal to 20,000 psi. It is to be understood that the pressure can be within a range between, and including, any of the pressure values described herein.

Figure 12:
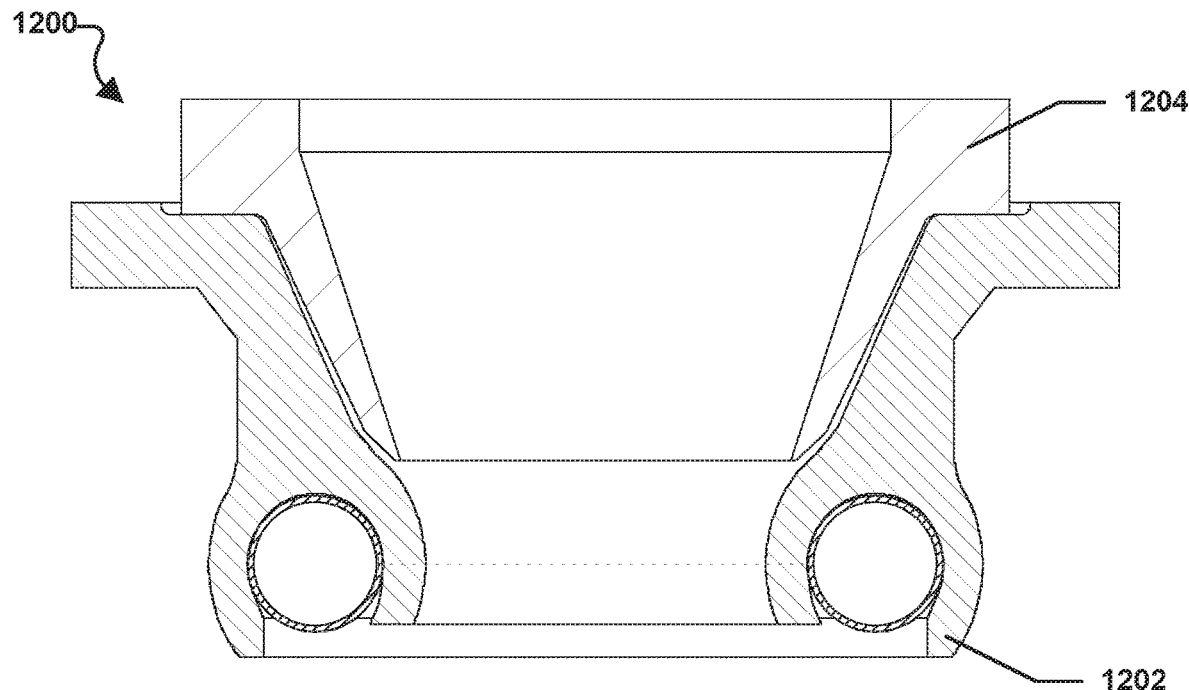
FIG. 12 includes an illustration of a cross-section view of another seal assembly in accordance with an embodiment.
Figure 13:
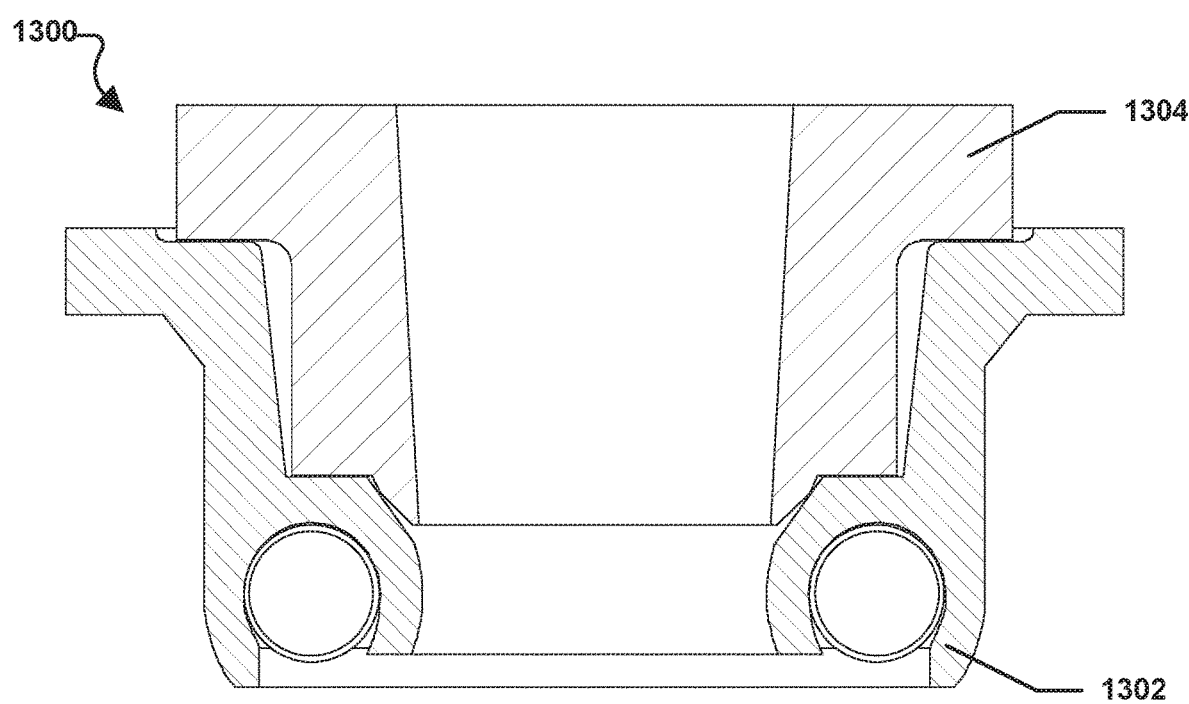
FIG. 13 includes an illustration of a cross-section view of yet another seal assembly in accordance with an embodiment.

FIG. 12 illustrates an additional embodiment of a seal assembly 1200. As shown, the seal assembly 1200 can include a spring energized seal 1202 and a back-up ring 1204. The seal assembly 1200 shares many characteristics with the seal assembly 100 described in detail herein. FIG. 13 shows still another embodiment of a seal assembly 1300. As shown, the seal assembly 1300 can include a spring energized seal 1302 and a back-up ring 1304. The seal assembly 1300 shares many characteristics with the seal assembly 100 described in detail herein.

Figure 14:
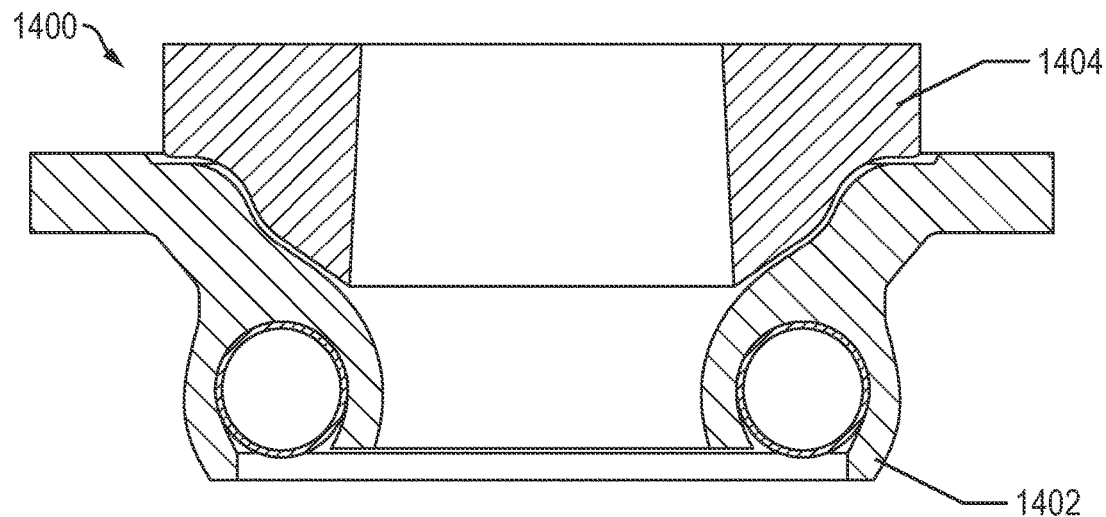
FIG. 14 includes an illustration of a cross-section view of still another seal assembly in accordance with an embodiment.
Figure 15:
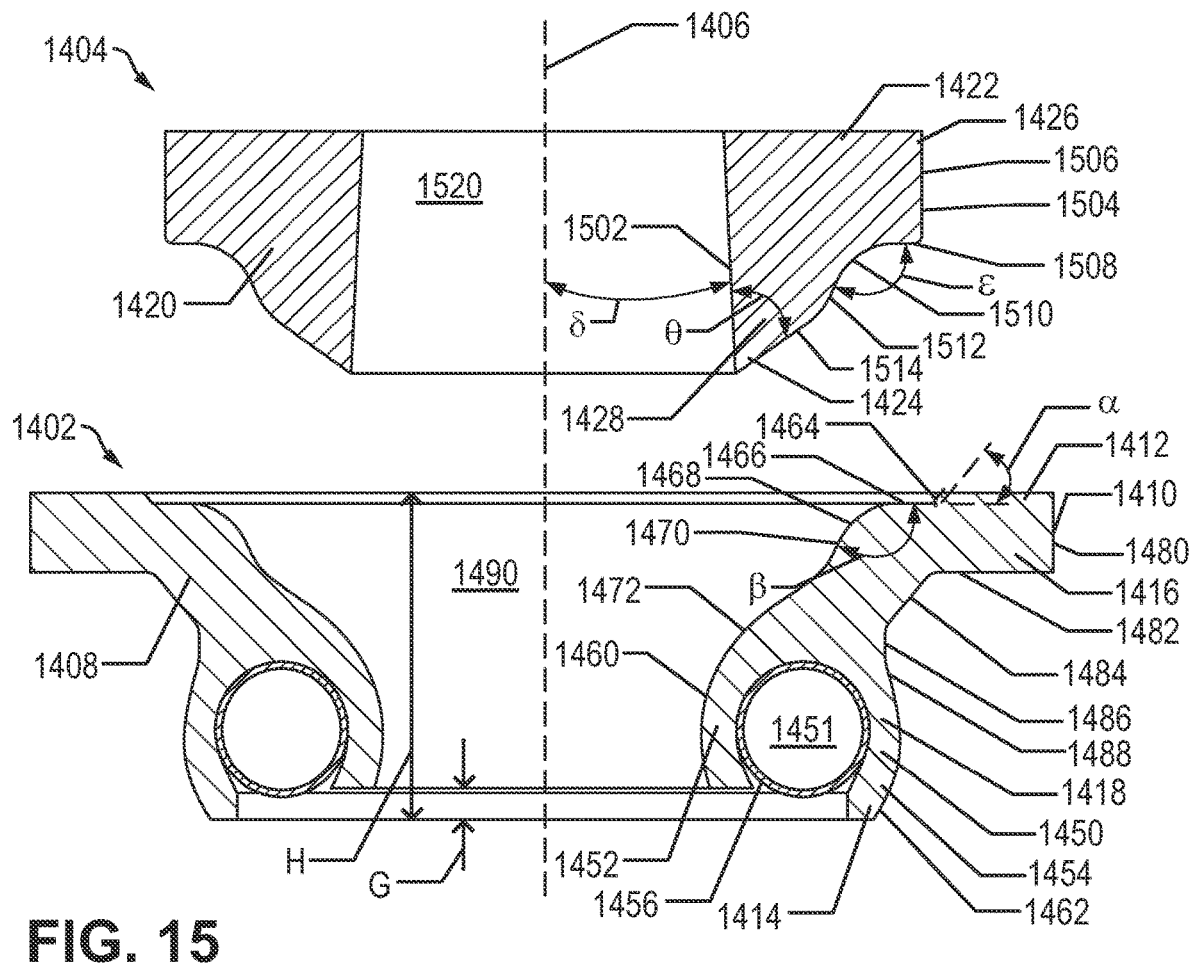
FIG. 15 includes an illustration of a cross-section and exploded view of the still another seal assembly in accordance with an embodiment.

Referring to FIG. 14 and FIG. 15, another seal assembly is illustrated and is generally designated 1400. As shown, the seal assembly 1400 can include a spring energized seal 1402 and a back-up ring 1404. In a particular aspect, and as described in greater detail below, the back-up ring 1404 fits at least partially within the spring energized seal 1402. Moreover, the seal assembly 1400 can define a longitudinal axis 1406.

As shown in FIG. 14 and FIG. 15, the spring energized seal 1402 can include a jacket 1408 having a body 1410 and the body 1410 of the jacket 1408 can include a first end 1412 and a second end 1414. Further, the body 1410 can include a head 1416 that is formed on the body 1410 adjacent to, or near, the first end 1412 of the body 1410. Moreover, the body 1410 of the jacket 1408 can include an extension 1418 that can extend away from the head 1416 in a direction substantially parallel to the longitudinal axis 1406.

FIG. 14 and FIG. 15 also shows that the back-up ring 1404 can include a body 1420 that includes a first end 1422 and a second end 1424. The body 1420 can include a head 1426 that is formed on the body 1420 adjacent to, or near, the first end 1422 of the body 1420. Additionally, the body 1420 can include an extension 1428 that can extend away from the head 1426 in a direction substantially parallel to the longitudinal axis 1406. In a particular aspect, the extension 1428 of the back-up ring 1404 can be generally frustoconical in shape.

As illustrated in FIG. 14 and FIG. 15, the extension 1418 of the body 110 of the spring energized seal 1402 can include a sealing portion 1450 formed at the second end 1414 of the body 1410. The sealing portion 1450 can include an inner extension portion 1452 and an outer extension portion 1454. Further, the sealing portion 1450 can include an annular spring pocket 1451 formed between the inner extension portion 1452 and the outer extension portion 1454. The spring energized seal 1402 can further include an annular spring 1456 disposed within the annular spring pocket 1451.

In a particular aspect, the spring energized seal 1402 can have a gap, G, measured between the bottom of the inner extension portion 1452 and the bottom surface of the second end 1414 of the body 1410 of the jacket 4108 of the spring energized seal 1402. When compared to an overall height, H, of the spring energized seal 1402, G can be can be less than or equal to 25.0% H. Moreover, G can be less than or equal to 22.5% H, such as less than or equal to 20.0% H, less than or equal to 17.5% H, less than or equal to 15.0% H, less than or equal to 12.5% H, or less than or equal to 10.0% H. In another aspect, G can be greater than or equal to 2.5% H, such as greater than or equal to 5.0% H, greater than or equal to 7.5% H, greater than or equal to 8.0% H, greater than or equal to 8.5% H, greater than or equal to 9.0% H, or greater than or equal to 9.5% H. It is to be understood that G can be within a range between, and including, any of the maximum or minimum values of G described herein.

FIG. 14 and FIG. 15 further indicate that the body 1410 of the spring energized seal 1402 can further include an interior surface 1460 and an exterior surface 1462. The interior surface 1460 can extend from the first end 1412 of the body 1410 to the second end of the body 1414 and can include a flat first portion 1464 and a flat second portion 1466. The flat second portion 1466 can be substantially perpendicular to the longitudinal axis 1404. Further, the flat first portion 1464 can be formed at an angle, $\alpha$, with respect to a line or plane passing through the flat second portion 1466 of the interior surface 1460. For example, a can be greater than or equal to 22.5°. Further, $\alpha$ can be greater than or equal to 30°, such as greater than or equal to 35°, greater than or equal to 40°, or greater than or equal to 45°. In another aspect, $\alpha$ can be less than or equal to 67.5°, such as less than or equal to 65°, less than or equal to 60°, less than or equal to 55°, or less than or equal to 50°. It is to be understood that $\alpha$ can be within a range between, and including, any of the minimum and maximum values of $\alpha$ described herein.

The interior surface 1460 of the body 1410 of the jacket 1408 of the spring energized seal 1402 can further include a curved third portion 1468 that extends in a generally downward direction until it reaches a flat fourth portion 1470. The flat fourth portion 1470 of the interior surface 1460 can also extend generally downward to a curved fifth portion 1472. The curved fifth portion 1472 can terminate at the second end 114 of the extension 1418 of the body 1410.

In a particular aspect, the flat fourth portion 1480 can form an angle, $\beta$, with respect to the flat second portion 1466 of the interior surface 1460 of the body 1410 of the jacket 1408 of the spring energized seal 1402. In a particular aspect, $\beta$ can be greater than or equal to 95°. Further, $\beta$ can be greater than or equal to 100°, such as greater than or equal to 105°, or greater than or equal to 110°. In another aspect, $\beta$ can be less than or equal to 130°, such as less than or equal to 125°, less than or equal to 120°, or less than or equal to 115°. It is to be understood that $\beta$ can be within a range between, and including, any of the minimum and maximum values of $\beta$ described herein.

As further illustrated in FIG. 14 and FIG. 15, the exterior surface 1462 of the body 1410 of the jacket 1408 of the spring energized seal 1402 can include a flat first portion 1480 that can extend substantially parallel to the longitudinal axis 1406 of the spring assembly 1400. A flat second portion 1482 can extend generally inward from the first portion 1480 and is substantially perpendicular to the longitudinal axis 1406 of the spring assembly 1406. At flat third portion 1484 can extend generally downward from the flat second portion 1482 at an angle, $\gamma$, with respect to the flat second portion 1482 of the exterior surface 1462 of the extension 1418 of the body 1410 of the jacket 1408 of the spring energized seal 1402. In a particular aspect, $\gamma$ can be greater than or equal to 110°. Further, $\gamma$ can be greater than or equal to 115°, such as greater than or equal to 120°, greater than or equal to 125°, or greater than or equal to 130°. In another aspect, $\gamma$ can be less than or equal to 150°, such as less than or equal to 145°, less than or equal to 140°, or less than or equal to 135°. It is to be understood that $\gamma$ can be within a range between, and including, any of the minimum and maximum values of $\gamma$ described herein.

The exterior surface 1462 of the body 1410 of the jacket 1408 of the spring energized seal 1402 can further include a flat fourth portion 1486 that can extend in a generally downward direction from the flat third portion 1484 of the exterior surface 1462. The flat fourth portion 1486 can be generally parallel to the longitudinal axis 1406 of the spring assembly 1400. The exterior surface 1462 can also include a curved fifth portion 1488 that can extend generally downward and outward from the flat fourth portion 1486 of the exterior surface 1462 of the body 1410 of the jacket 140 of the spring energized seal 1402. The curved fifth portion 1488 of the exterior surface 162 can terminate at the second end 1414 of the extension 1418. As illustrated, a generally frustoconical bore 1490 can be formed within the body 1410 of the jacket 1408 of the spring energized seal 1402 and can be bound by the third and fourth portions 1468, 1470 of the interior surface 1460 of the body 1410 of the jacket 1408 of the spring energized seal 1402.

FIG. 14 and FIG. 15 further indicate that the body 1420 of the back-up ring 1404 can include an interior surface 1502 that can extend from the first end 1422 of the body 1420 to the second end 1424 of the body 1420. Further, the body 1420 of the back-up ring 1404 can include an exterior surface 1504 that can extend from the first end 1422 of the body 1420 to the second end 1424 of the body 1420. In a particular aspect, the interior surface 1502 of the body 1420 of the back-up ring 1404 can be formed at an angle, $\delta$, with respect to the longitudinal axis 1406. In a particular aspect, $\delta$ can be greater than or equal to 0.25°. Further, $\delta$ can be greater than or equal to 0.5°, such as greater than or equal to 0.75°, greater than or equal to 1.0°, greater than or equal to 1.5°, greater than or equal to 2.0°, greater than or equal to 2.5°, or greater than or equal to 3°. In another aspect, $\delta$ can be less than or equal to 10°, such as less than or equal to 7.5°, less than or equal to 5.0°, or less than or equal to 3.5°. It is to be understood that $\delta$ can be within a range between, and including, any of the minimum and maximum values of $\delta$ described herein.

As illustrated in FIG. 14 and FIG. 15, the exterior surface 1504 of the body 1420 of the back-up ring 1404 can include a flat first portion 1506 that is substantially parallel to the longitudinal axis 1406 of the spring assembly 1400. A flat second portion 1508 can extend inward from the flat first portion 1506 and can be substantially perpendicular to the longitudinal axis 1406 of the spring assembly 1400. The exterior surface 1504 can include a curved third portion 1510 that can extend generally downward and inward from the flat second portion 1508 of the exterior surface 1504 of the body 1420 of the back-up ring 1404. A flat fourth portion 1512 can extend generally downward and inward from the curved third portion 1510. Moreover, a flat fifth portion 1514 can extend downward and inward from the flat fourth portion 1512 and can terminate at the second end 1424 of the body 1420 of the back-up ring 1404.

In a particular aspect, the flat fourth portion 1512 can be formed at an angle, £, with respect to the flat second portion 1508. In a particular aspect, $\varepsilon$ can be greater than or equal to 95°. Further, $\varepsilon$ can be greater than or equal to 100°, such as greater than or equal to 105°, or greater than or equal to 110°. In another aspect, $\varepsilon$ can be less than or equal to 130°, such as less than or equal to 125°, less than or equal to 120°, or less than or equal to 115°. It is to be understood that ε can be within a range between, and including, any of the minimum and maximum values of ε described herein. In a particular aspect, ε can be substantially equal to γ.

As depicted in FIG. 14 and FIG. 15, the interior surface 1502 of the body 1420 of the back-up ring 1404 can form an angle, θ, with respect to the flat fifth portion 1514 of the exterior surface 1504 of the body 1420 of the back-up ring 1404. In particular, θ can be can be greater than or equal to 30°. Further, θ can be greater than or equal to 35°, such as greater than or equal to 40°, greater than or equal to 45°, greater than or equal to 50°, or greater than or equal to 55°. In another aspect, ε can be less than or equal to 80°, such as less than or equal to 75°, less than or equal to 70°, less than or equal to 65°, or less than or equal to 60°. It is to be understood that θ can be within a range between, and including, any of the minimum and maximum values of θ described herein.

FIG. 14 and FIG. 15 show that a frustoconical bore 1520 can be formed within the body 1420 of the back-up ring 1404. The frustoconical bore 1520 within the body 1420 of the back-up ring 1404 can be bound by the interior surface 1502 of the body 1420 of the back-up ring 1404. The frustoconical bore 1520 can have an upper radius, $R_U$, measured at the first end 1422 of the back-up ring 1404 and a lower radius, $R_L$, measured at the second end 1424 of the back-up ring 1404. In a particular aspect, $R_U$ can be less than $R_L$. In particular, $R_U$ can be less than or equal to 99.75% $R_L$. Further, $R_U$ can be less than or equal to 99.5% $R_L$, such as less than or equal to 99.25% $R_L$, less than or equal to 99.0% $R_L$, less than or equal to 98.75% $R_L$, less than or equal to 98.5% $R_L$, or less than or equal to 98.25% $R_L$. In another aspect, $R_U$ can be greater than or equal to 90.0% $R_L$, such as greater than or equal to 92.5% $R_L$, greater than or equal to 95.0% $R_L$, greater than or equal to 97.5% $R_L$, or greater than or equal to 98.0% $R_L$. It is to be understood that $R_U$ can be within a range between, and including, any of the maximum and minimum values of $R_U$ described herein. As shown, the diameter of the frustoconical bore 1520 can expand outward as the bore is traversed from the first end 1422 of the body 1420 of the back-up ring 1404 to the second end 1424 of the body 1420 of the back-up ring 1404.

In another aspect, $R_U$ can be greater than $R_L$. In particular, $R_U$ can be greater than or equal to 100.25% $R_L$. Further, $R_U$ can be greater than or equal to 100.5% $R_L$, such as greater than or equal to 100.75% $R_L$, greater than or equal to 101.0% $R_L$, greater than or equal to 101.25% $R_L$, greater than or equal to 101.5% $R_L$, or greater than or equal to 101.75% $R_L$. In another aspect, $R_U$ can be less than or equal to 110.0% $R_L$, such as less than or equal to 107.5% $R_L$, less than or equal to 105.0% $R_L$, less than or equal to 102.5% $R_L$, or less than or equal to 102.0% $R_L$. It is to be understood that $R_U$ can be within a range between, and including, any of the maximum and minimum values of $R_U$ described herein. In this aspect, the diameter of the frustoconical bore 1520 can expand inward as the bore is traversed from the first end 1422 of the body 1420 of the back-up ring 1404 to the second end 1424 of the body 1420 of the back-up ring 1404.

When the back-up ring 1404 is installed within the spring energized seal 1402, as depicted in FIG. 14, the back-up ring 1404 can extend at least partially into the spring energized seal 1402. Specifically, the frustoconical extension 1428 of the body 1420 of the back-up ring 1404 can fit into the frustoconical bore 1490 formed in the body 1410 of the jacket 1408 of the spring energized seal 1402.

It can be appreciated that the shape of the back-up ring 1404 and the spring energized seal 1402 are adapted to allow the spring energized seal 1402 to flex longitudinally as a shaft, e.g., a pump shaft, installed therein reciprocates along the longitudinal axis 1406. The spring energized seal 1402 is adapted to allow the jacket 1408 to move with respect to the back-up ring 1404 as the shaft reciprocates. Specifically, the jacket 1408 and the spring 1456 can move slightly as the shaft reciprocates in the direction of travel with the shaft while maintaining the sealing portion of the jacket 1408 around the spring 1456 in proper contact with the shaft and a housing and maintaining the spring 1456 in proper alignment within the seal assembly 1400.

Figure 16:
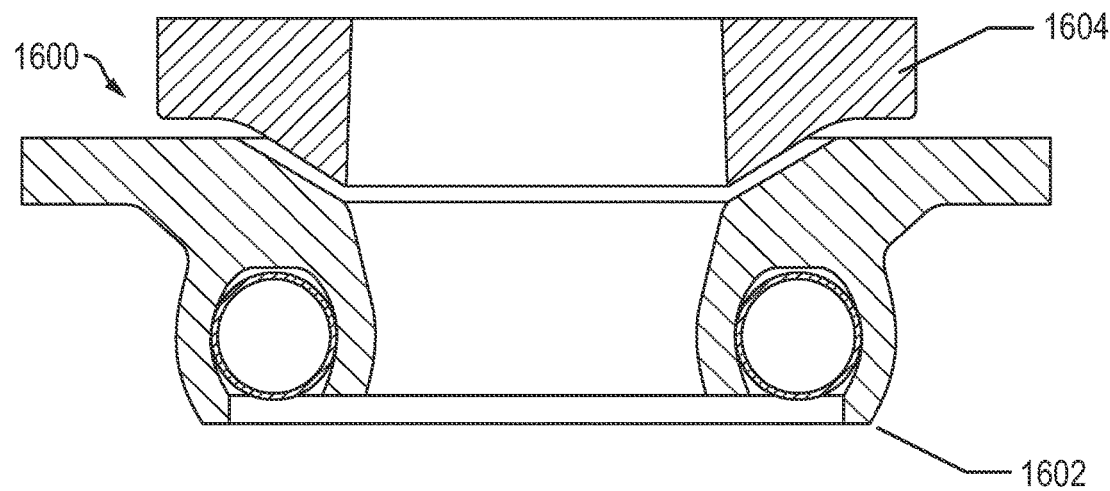
FIG. 16 includes an illustration of a cross-section view of yet still another seal assembly in accordance with an embodiment.
Figure 17:
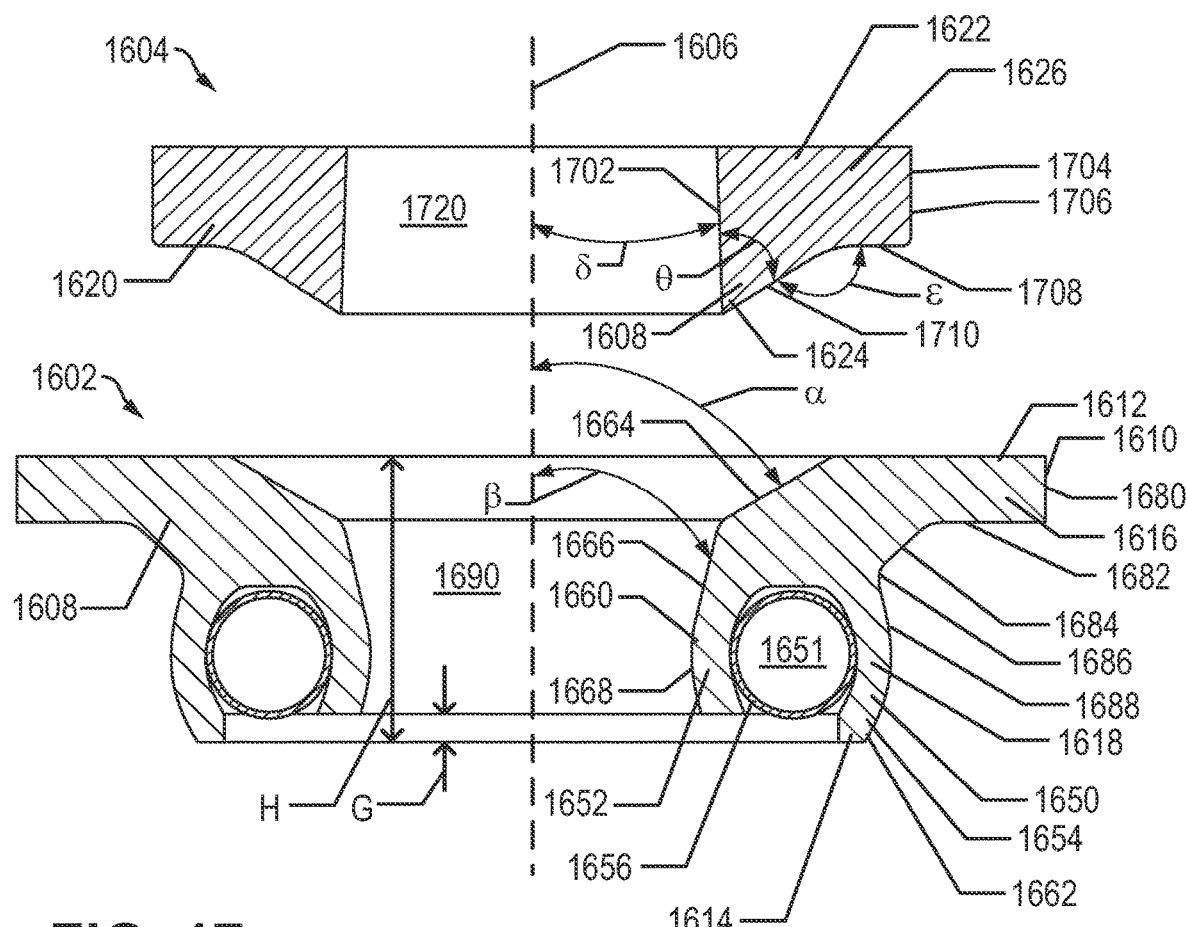
FIG. 17 includes an illustration of a cross-section and exploded view of the yet still another seal assembly in accordance with an embodiment.

Referring now to FIG. 16 and FIG. 17, another seal assembly is illustrated and is generally designated 1600. As shown, the seal assembly 1600 can include a spring energized seal 1602 and a back-up ring 1604. In a particular aspect, and as described in greater detail below, the back-up ring 1604 fits at least partially within the spring energized seal 1602. Moreover, the seal assembly 1600 can define a longitudinal axis 1606.

As shown in FIG. 16 and FIG. 17, the spring energized seal 1602 can include a jacket 1608 having a body 1610 and the body 1610 of the jacket 1608 can include a first end 1612 and a second end 1614. Further, the body 1610 can include a head 1616 that is formed on the body 1610 adjacent to, or near, the first end 1612 of the body 1610. Moreover, the body 1610 of the jacket 1608 can include an extension 1618 that can extend away from the head 1616 in a direction substantially parallel to the longitudinal axis 1606.

FIG. 16 and FIG. 17 also shows that the back-up ring 1604 can include a body 1620 that includes a first end 1622 and a second end 1624. The body 1620 can include a head 1626 that is formed on the body 1620 adjacent to, or near, the first end 1622 of the body 1620. Additionally, the body 1620 can include an extension 1628 that can extend away from the head 1626 in a direction substantially parallel to the longitudinal axis 1606. In a particular aspect, the extension 1628 of the back-up ring 1604 can be generally frustoconical in shape.

As illustrated in FIG. 16 and FIG. 17, the extension 1618 of the body 110 of the spring energized seal 1602 can include a sealing portion 1650 formed at the second end 1614 of the body 1610. The sealing portion 1650 can include an inner extension portion 1652 and an outer extension portion 1654. Further, the sealing portion 1650 can include an annular spring pocket 1651 formed between the inner extension portion 1652 and the outer extension portion 1654. The spring energized seal 1602 can further include an annular spring 1656 disposed within the annular spring pocket 1651.

In a particular aspect, the spring energized seal 1602 can have a gap, G, measured between the bottom of the inner extension portion 1652 and the bottom surface of the second end 1614 of the body 1610 of the jacket 1608 of the spring energized seal 1602. When compared to an overall height, H, of the spring energized seal 1602, G can be can be less than or equal to 25.0% H. Moreover, G can be less than or equal to 22.5% H, such as less than or equal to 20.0% H, less than or equal to 17.5% H, less than or equal to 15.0% H, less than or equal to 12.5% H, or less than or equal to 10.0% H. In another aspect, G can be greater than or equal to 2.5% H, such as greater than or equal to 5.0% H, greater than or equal to 7.5% H, greater than or equal to 8.0% H, greater than or equal to 8.5% H, greater than or equal to 9.0% H, or greater than or equal to 9.5% H. It is to be understood that G can be within a range between, and including, any of the maximum or minimum values of G described herein.

FIG. 16 and FIG. 17 further indicate that the body 1610 of the spring energized seal 1602 can further include an interior surface 1660 and an exterior surface 1662. The interior surface 1660 can extend from the first end 1612 of the body 1610 to the second end of the body 1614 and can include a flat first portion 1664 that can extend generally downward and inward from the first end 1612 of the body 1610 of the jacket 1608 of the spring energized seal 1602. Moreover, the interior surface 1660 can include a flat second portion 1666 that can extend generally downward and inward from the flat first portion 1664 of the interior surface 1660 of the body 1610 of the jacket 1608. A curved third portion 1668 can extend from the flat second portion 1666 and can terminate at the end of the inner extension portion 1652.

In a particular aspect, the flat second portion 1666 can be formed at an angle, $\alpha$, with respect to the longitudinal axis 1606. For example, a can be greater than or equal to 40°. Further, a can be greater than or equal to 45°, such as greater than or equal to 50°, greater than or equal to 55°, or greater than or equal to 60°. In another aspect, $\alpha$ can be less than or equal to 80°, such as less than or equal to 75°, less than or equal to 70°, or less than or equal to 65°. It is to be understood that $\alpha$ can be within a range between, and including, any of the minimum and maximum values of $\alpha$ described herein.

In another aspect, the flat second portion 1666 can form an angle, $\beta$, with respect to the longitudinal axis 1606 of the spring assembly 1600. In a particular aspect, $\beta$ can be greater than or equal to 5°. Further, $\beta$ can be greater than or equal to 9°, such as greater than or equal to 10°, greater than or equal to 11°, greater than or equal to 12°, or greater than or equal to 13°. In another aspect, $\beta$ can be less than or equal to 20°, such as less than or equal to 17°, less than or equal to 16°, less than or equal to 15°, or less than or equal to 14°. It is to be understood that $\beta$ can be within a range between, and including, any of the minimum and maximum values of $\beta$ described herein.

As further illustrated in FIG. 16 and FIG. 17, the exterior surface 1662 of the body 1610 of the jacket 1608 of the spring energized seal 1602 can include a flat first portion 1680 that can extend substantially parallel to the longitudinal axis 1606 of the spring assembly 1600. A flat second portion 1682 can extend generally inward from the first portion 1680 and is substantially perpendicular to the longitudinal axis 1606 of the spring assembly 1606. At flat third portion 1684 can extend generally downward from the flat second portion 1682 at an angle, $\gamma$, with respect to the flat second portion 1682 of the exterior surface 1662 of the extension 1618 of the body 1610 of the jacket 1608 of the spring energized seal 1602. In a particular aspect, $\gamma$ can be greater than or equal to 110°. Further, $\gamma$ can be greater than or equal to 115°, such as greater than or equal to 120°, greater than or equal to 125°, or greater than or equal to 130°. In another aspect, $\gamma$ can be less than or equal to 170°, such as less than or equal to 165°, less than or equal to 160°, or less than or equal to 135°. It is to be understood that $\gamma$ can be within a range between, and including, any of the minimum and maximum values of $\gamma$ described herein.

The exterior surface 1662 of the body 1610 of the jacket 1608 of the spring energized seal 1602 can further include a flat fourth portion 1686 that can extend in a generally downward direction from the flat third portion 1684 of the exterior surface 1662. The flat fourth portion 1686 can be generally parallel to the longitudinal axis 1606 of the spring assembly 1600. The exterior surface 1662 can also include a curved fifth portion 1688 that can extend generally downward and outward from the flat fourth portion 1686 of the exterior surface 1662 of the body 1610 of the jacket 160 of the spring energized seal 1602. The curved fifth portion 1688 of the exterior surface 162 can terminate at the second end 1614 of the extension 1618. As illustrated, a generally frustoconical bore 1690 can be formed within the body 1610 of the jacket 1608 of the spring energized seal 1602 and can be bound by the first and second portions 1664, 1666 of the interior surface 1660 of the body 1610 of the jacket 1608 of the spring energized seal 1602.

FIG. 16 and FIG. 17 further indicate that the body 1620 of the back-up ring 1604 can include an interior surface 1702 that can extend from the first end 1622 of the body 1620 to the second end 1624 of the body 1620. Further, the body 1620 of the back-up ring 1604 can include an exterior surface 1704 that can extend from the first end 1622 of the body 1620 to the second end 1624 of the body 1620. In a particular aspect, the interior surface 1702 of the body 1620 of the back-up ring 1604 can be formed at an angle, $\delta$, with respect to the longitudinal axis 1606. In a particular aspect, $\delta$ can be greater than or equal to 0.25°. Further, $\delta$ can be greater than or equal to 0.5°, such as greater than or equal to 0.75°, greater than or equal to 1.0°, greater than or equal to 1.5°, greater than or equal to 2.0°, greater than or equal to 2.5°, or greater than or equal to 3°. In another aspect, $\delta$ can be less than or equal to 10°, such as less than or equal to 7.5°, less than or equal to 5.0°, or less than or equal to 3.5°. It is to be understood that $\delta$ can be within a range between, and including, any of the minimum and maximum values of $\delta$ described herein.

As illustrated in FIG. 16 and FIG. 17, the exterior surface 1704 of the body 1620 of the back-up ring 1604 can include a flat first portion 1706 that is substantially parallel to the longitudinal axis 1606 of the spring assembly 1600. A flat second portion 1708 can extend inward from the flat first portion 1706 and can be substantially perpendicular to the longitudinal axis 1606 of the spring assembly 1600. The exterior surface 1704 can include a flat third portion 1710 that can extend generally downward and inward from the flat second portion 1708 of the exterior surface 1704 of the body 1620 of the back-up ring 1604. The flat third portion 1710 can terminate at the second end 1624 of the body 1620 of the back-up ring 1604.

In a particular aspect, the flat third portion 1710 can be formed at an angle, £, with respect to the flat second portion 1708. In a particular aspect, $\varepsilon$ can be greater than or equal to 95°. Further, $\varepsilon$ can be greater than or equal to 100°, such as greater than or equal to 105°, or greater than or equal to 110°. In another aspect, $\varepsilon$ can be less than or equal to 130°, such as less than or equal to 125°, less than or equal to 120°, or less than or equal to 115°. It is to be understood that $\varepsilon$ can be within a range between, and including, any of the minimum and maximum values of $\varepsilon$ described herein.

As depicted in FIG. 16 and FIG. 17, the interior surface 1702 of the body 1620 of the back-up ring 1604 can form an angle, $\theta$, with respect to the flat third portion 1710 of the exterior surface 1704 of the body 1620 of the back-up ring 1604. In particular, $\theta$ can be can be greater than or equal to 30°. Further, $\theta$ can be greater than or equal to 35°, such as greater than or equal to 40°, greater than or equal to 45°, greater than or equal to 50°, or greater than or equal to 55°. In another aspect, $\theta$ can be less than or equal to 80°, such as less than or equal to 75°, less than or equal to 70°, less than or equal to 65°, or less than or equal to 60°. It is to be understood that $\theta$ can be within a range between, and including, any of the minimum and maximum values of $\theta$ described herein.

FIG. 16 and FIG. 17 show that a frustoconical bore 1720 can be formed within the body 1620 of the back-up ring 1604. The frustoconical bore 1720 within the body 1620 of the back-up ring 1604 can be bound by the interior surface 1702 of the body 1620 of the back-up ring 1604. The frustoconical bore 1720 can have an upper radius, $R_U$, measured at the first end 1622 of the back-up ring 1604 and a lower radius, $R_L$, measured at the second end 1624 of the back-up ring 1604. In a particular aspect, $R_U$ can be less than $R_L$. In particular, $R_U$ can be less than or equal to 99.75% $R_L$. Further, $R_U$ can be less than or equal to 99.5% $R_L$, such as less than or equal to 99.25% $R_L$, less than or equal to 99.0% $R_L$, less than or equal to 98.75% $R_L$, less than or equal to 98.5% $R_L$, or less than or equal to 98.25% $R_L$. In another aspect, $R_U$ can be greater than or equal to 90.0% $R_L$, such as greater than or equal to 92.5% $R_L$, greater than or equal to 95.0% $R_L$, greater than or equal to 97.5% $R_L$, or greater than or equal to 98.0% $R_L$. It is to be understood that $R_U$ can be within a range between, and including, any of the maximum and minimum values of $R_U$ described herein. As shown, the diameter of the frustoconical bore 1720 can expand outward as the bore is traversed from the first end 1622 of the body 1620 of the back-up ring 1604 to the second end 1624 of the body 1620 of the back-up ring 1604.

In another aspect, $R_U$ can be greater than $R_L$. In particular, $R_U$ can be greater than or equal to 100.25% $R_L$. Further, $R_U$ can be greater than or equal to 100.5% $R_L$, such as greater than or equal to 100.75% $R_L$, greater than or equal to 101.0% $R_L$, greater than or equal to 101.25% $R_L$, greater than or equal to 101.5% $R_L$, or greater than or equal to 101.75% $R_L$. In another aspect, $R_U$ can be less than or equal to 110.0% $R_L$, such as less than or equal to 107.5% $R_L$, less than or equal to 105.0% $R_L$, less than or equal to 102.5% $R_L$, or less than or equal to 102.0% $R_L$. It is to be understood that $R_U$ can be within a range between, and including, any of the maximum and minimum values of $R_U$ described herein. In this aspect, the diameter of the frustoconical bore 1720 can expand inward as the bore is traversed from the first end 1622 of the body 1620 of the back-up ring 1604 to the second end 1624 of the body 1620 of the back-up ring 1604.

When the back-up ring 1604 is installed within the spring energized seal 1602, as depicted in FIG. 16, the back-up ring 1604 can extend at least partially into the spring energized seal 1602. Specifically, the frustoconical extension 1628 of the body 1620 of the back-up ring 1604 can fit into the frustoconical bore 1690 formed in the body 1610 of the jacket 1608 of the spring energized seal 1602.

It can be appreciated that the shape of the back-up ring 1604 and the spring energized seal 1602 are adapted to allow the spring energized seal 1602 to flex longitudinally as a shaft installed therein reciprocates along the longitudinal axis 1606. The spring energized seal 1602 is adapted to allow the jacket 1608 to move with respect to the back-up ring 1604 as the shaft reciprocates. Specifically, the jacket 1608 and the spring 1656 can move slightly as the shaft reciprocates in the direction of travel with the shaft while maintaining the sealing portion of the jacket 1608 around the spring 1656 in proper contact with the shaft and a housing and maintaining the spring 1656 in proper alignment within the seal assembly 1600.

Figure 18:
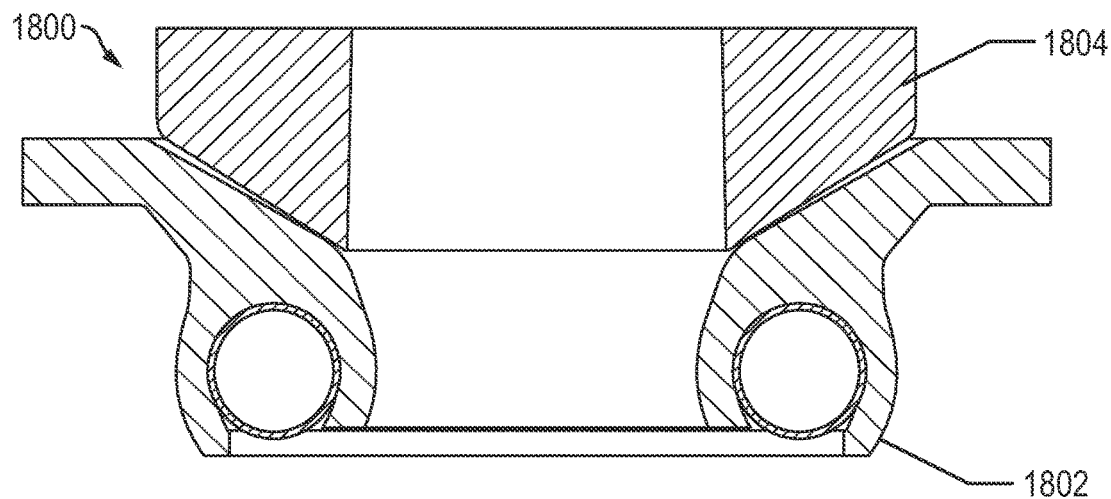
FIG. 18 includes an illustration of a cross-section view of still yet another seal assembly in accordance with an embodiment.
Figure 19:
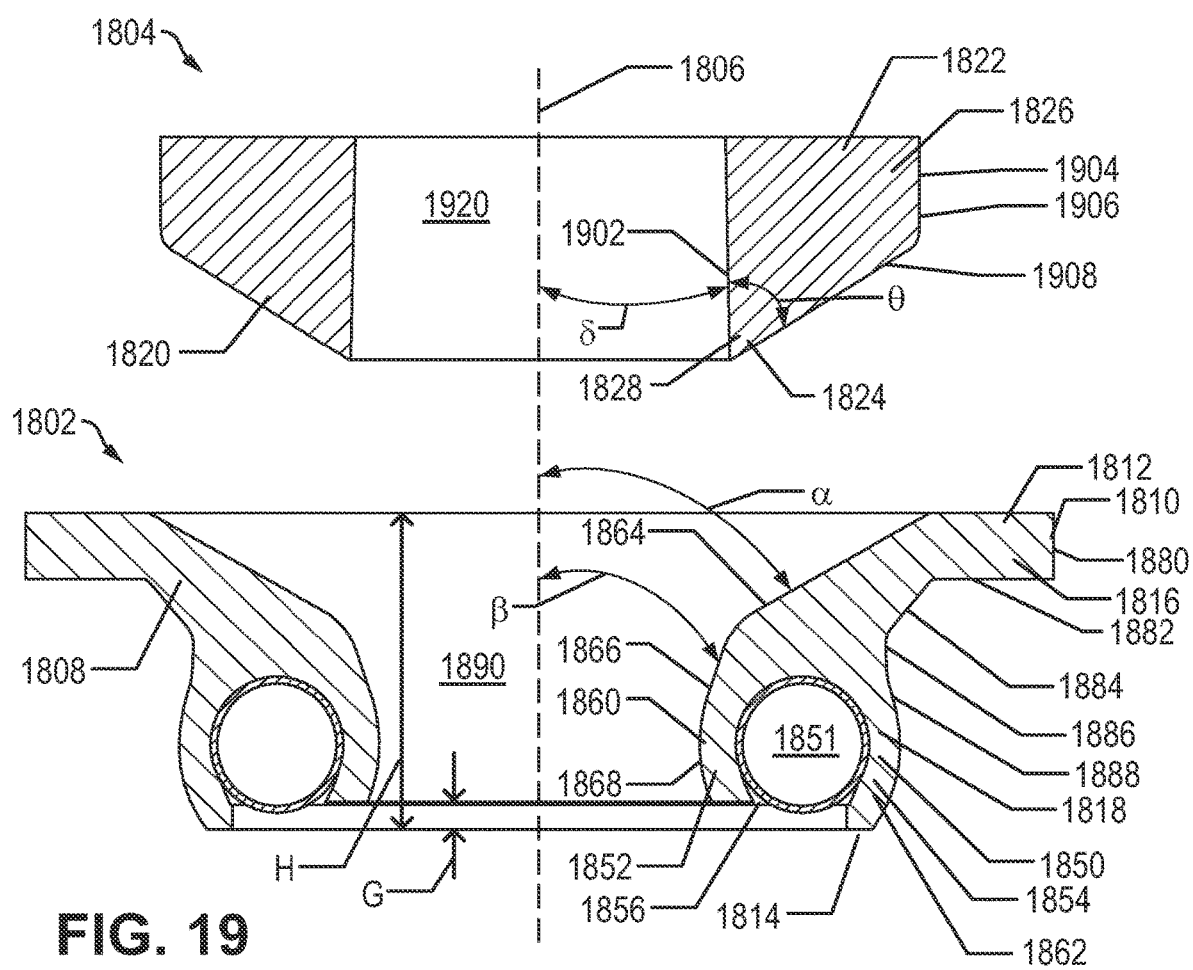
FIG. 19 includes an illustration of a cross-section and exploded view of the still yet another seal assembly in accordance with an embodiment.

Referring now to FIG. 18 and FIG. 19, another seal assembly is illustrated and is generally designated 1800. As shown, the seal assembly 1800 can include a spring energized seal 1802 and a back-up ring 1804. In a particular aspect, and as described in greater detail below, the back-up ring 1804 fits at least partially within the spring energized seal 1802. Moreover, the seal assembly 1800 can define a longitudinal axis 1806.

As shown in FIG. 18 and FIG. 19, the spring energized seal 1802 can include a jacket 1808 having a body 1810 and the body 1810 of the jacket 1808 can include a first end 1812 and a second end 1814. Further, the body 1810 can include a head 1816 that is formed on the body 1810 adjacent to, or near, the first end 1812 of the body 1810. Moreover, the body 1810 of the jacket 1808 can include an extension 1818 that can extend away from the head 1816 in a direction substantially parallel to the longitudinal axis 1806.

FIG. 18 and FIG. 19 also shows that the back-up ring 1804 can include a body 1820 that includes a first end 1822 and a second end 1824. The body 1820 can include a head 1826 that is formed on the body 1820 adjacent to, or near, the first end 1822 of the body 1820. Additionally, the body 1820 can include an extension 1828 that can extend away from the head 1826 in a direction substantially parallel to the longitudinal axis 1806. In a particular aspect, the extension 1828 of the back-up ring 1804 can be generally frustoconical in shape.

As illustrated in FIG. 18 and FIG. 19, the extension 1818 of the body 110 of the spring energized seal 1802 can include a sealing portion 1850 formed at the second end 1814 of the body 1810. The sealing portion 1850 can include an inner extension portion 1852 and an outer extension portion 194. Further, the sealing portion 1850 can include an annular spring pocket 1851 formed between the inner extension portion 1852 and the outer extension portion 1854. The spring energized seal 1802 can further include an annular spring 1856 disposed within the annular spring pocket 1851.

In a particular aspect, the spring energized seal 1802 can have a gap, G, measured between the bottom of the inner extension portion 1852 and the bottom surface of the second end 1814 of the body 1810 of the jacket 1808 of the spring energized seal 1802. When compared to an overall height, H, of the spring energized seal 1802, G can be can be less than or equal to 25.0% H. Moreover, G can be less than or equal to 22.5% H, such as less than or equal to 20.0% H, less than or equal to 19.5% H, less than or equal to 15.0% H, less than or equal to 12.5% H, or less than or equal to 10.0% H. In another aspect, G can be greater than or equal to 2.5% H, such as greater than or equal to 5.0% H, greater than or equal to 7.5% H, greater than or equal to 8.0% H, greater than or equal to 8.5% H, greater than or equal to 9.0% H, or greater than or equal to 9.5% H. It is to be understood that G can be within a range between, and including, any of the maximum or minimum values of G described herein.

FIG. 18 and FIG. 19 further indicate that the body 1810 of the spring energized seal 1802 can further include an interior surface 1860 and an exterior surface 1862. The interior surface 1860 can extend from the first end 1812 of the body 1810 to the second end of the body 1814 and can include a flat first portion 1864 that can extend generally downward and inward from the first end 1812 of the body 1810 of the jacket 1808 of the spring energized seal 1802. Moreover, the interior surface 1860 can include a flat second portion 1866 that can extend generally downward and inward from the flat first portion 1864 of the interior surface 1860 of the body 1810 of the jacket 1808. A curved third portion 1868 can extend from the flat second portion 1866 and can terminate at the end of the inner extension portion 1852.

In a particular aspect, the flat second portion 1866 can be formed at an angle, α, with respect to the longitudinal axis 1806. For example, α can be greater than or equal to 40°.

Further, α can be greater than or equal to 45°, such as greater than or equal to 50°, greater than or equal to 55°, greater than or equal to 60°, or greater than or equal to 61°. In another aspect, α can be less than or equal to 80°, such as less than or equal to 75°, less than or equal to 70°, or less than or equal to 65°. It is to be understood that α can be within a range between, and including, any of the minimum and maximum values of α described herein.

In another aspect, the flat second portion 1866 can form an angle, β, with respect to the longitudinal axis 1806 of the spring assembly 1800. In a particular aspect, β can be greater than or equal to 5°. Further, β can be greater than or equal to 10°, such as greater than or equal to 15°, or greater than or equal to 20°. In another aspect, β can be less than or equal to 40°, such as less than or equal to 35°, less than or equal to 30°, or less than or equal to 25°. It is to be understood that β can be within a range between, and including, any of the minimum and maximum values of β described herein.

As further illustrated in FIG. 18 and FIG. 19, the exterior surface 1862 of the body 1810 of the jacket 1808 of the spring energized seal 1802 can include a flat first portion 1880 that can extend substantially parallel to the longitudinal axis 1806 of the spring assembly 1800. A flat second portion 1882 can extend generally inward from the first portion 1880 and is substantially perpendicular to the longitudinal axis 1806 of the spring assembly 1806. At flat third portion 1884 can extend generally downward from the flat second portion 1882 at an angle, γ, with respect to the flat second portion 1882 of the exterior surface 1862 of the extension 1818 of the body 1810 of the jacket 1808 of the spring energized seal 1802. In a particular aspect, γ can be greater than or equal to 110°. Further, γ can be greater than or equal to 115°, such as greater than or equal to 120°, greater than or equal to 125°, or greater than or equal to 130°. In another aspect, γ can be less than or equal to 190°, such as less than or equal to 185°, less than or equal to 180°, or less than or equal to 135°. It is to be understood that γ can be within a range between, and including, any of the minimum and maximum values of γ described herein.

The exterior surface 1862 of the body 1810 of the jacket 1808 of the spring energized seal 1802 can further include a flat fourth portion 1886 that can extend in a generally downward direction from the flat third portion 1884 of the exterior surface 1862. The flat fourth portion 1886 can be generally parallel to the longitudinal axis 1806 of the spring assembly 1800. The exterior surface 1862 can also include a curved fifth portion 1888 that can extend generally downward and outward from the flat fourth portion 1886 of the exterior surface 1862 of the body 1810 of the jacket 180 of the spring energized seal 1802. The curved fifth portion 1888 of the exterior surface 182 can terminate at the second end 1814 of the extension 1818. As illustrated, a generally frustoconical bore 1890 can be formed within the body 1810 of the jacket 1808 of the spring energized seal 1802 and can be bound by the first and second portions 1864, 1866 of the interior surface 1860 of the body 1810 of the jacket 1808 of the spring energized seal 1802.

FIG. 18 and FIG. 19 further indicate that the body 1820 of the back-up ring 1804 can include an interior surface 1902 that can extend from the first end 1822 of the body 1820 to the second end 1824 of the body 1820. Further, the body 1820 of the back-up ring 1804 can include an exterior surface 1904 that can extend from the first end 1822 of the body 1820 to the second end 1824 of the body 1820. In a particular aspect, the interior surface 1902 of the body 1820 of the back-up ring 1804 can be formed at an angle, δ, with respect to the longitudinal axis 1806. In a particular aspect, δ can be greater than or equal to 0.25°. Further, δ can be greater than or equal to 0.5°, such as greater than or equal to 0.75°, greater than or equal to 1.0°, greater than or equal to 1.5°, greater than or equal to 2.0°, greater than or equal to 2.5°, or greater than or equal to 3°. In another aspect, δ can be less than or equal to 10°, such as less than or equal to 7.5°, less than or equal to 5.0°, or less than or equal to 3.5°. It is to be understood that δ can be within a range between, and including, any of the minimum and maximum values of δ described herein.

As illustrated in FIG. 18 and FIG. 19, the exterior surface 1904 of the body 1820 of the back-up ring 1804 can include a flat first portion 1906 that is substantially parallel to the longitudinal axis 1806 of the spring assembly 1800. A flat second portion 1908 can extend generally downward and inward from the flat first portion 1906 at an angle with respect to the flat first portion. The flat second portion 1908 can terminate at the second end 1824 of the body 1820 of the back-up ring 1804.

As depicted in FIG. 18 and FIG. 19, the interior surface 1902 of the body 1820 of the back-up ring 1804 can form an angle, θ, with respect to the flat third portion 1910 of the exterior surface 1904 of the body 1820 of the back-up ring 1804. In particular, θ can be can be greater than or equal to 30°. Further, θ can be greater than or equal to 35°, such as greater than or equal to 40°, greater than or equal to 45°, greater than or equal to 50°, greater than or equal to 55°, or greater than or equal to 58°. In another aspect, θ can be less than or equal to 80°, such as less than or equal to 75°, less than or equal to 70°, less than or equal to 65°, or less than or equal to 60°. It is to be understood that θ can be within a range between, and including, any of the minimum and maximum values of θ described herein.

FIG. 18 and FIG. 19 show that a frustoconical bore 1920 can be formed within the body 1820 of the back-up ring 1804. The frustoconical bore 1920 within the body 1820 of the back-up ring 1804 can be bound by the interior surface 1902 of the body 1820 of the back-up ring 1804. The frustoconical bore 1920 can have an upper radius, $R_U$, measured at the first end 1822 of the back-up ring 1804 and a lower radius, $R_L$, measured at the second end 1824 of the back-up ring 1804. In a particular aspect, $R_U$ can be less than $R_L$. In particular, $R_U$ can be less than or equal to 99.75% $R_L$. Further, $R_U$ can be less than or equal to 99.5% $R_L$, such as less than or equal to 99.25% $R_L$, less than or equal to 99.0% $R_L$, less than or equal to 98.75% $R_L$, less than or equal to 98.5% $R_L$, or less than or equal to 98.25% $R_L$. In another aspect, $R_U$ can be greater than or equal to 90.0% $R_L$, such as greater than or equal to 92.5% $R_L$, greater than or equal to 95.0% $R_L$, greater than or equal to 97.5% $R_L$, or greater than or equal to 98.0% $R_L$. It is to be understood that $R_U$ can be within a range between, and including, any of the maximum and minimum values of $R_U$ described herein. As shown, the diameter of the frustoconical bore 1920 can expand outward as the bore is traversed from the first end 1822 of the body 1820 of the back-up ring 1804 to the second end 1824 of the body 1820 of the back-up ring 1804.

In another aspect, $R_U$ can be greater than $R_L$. In particular, $R_U$ can be greater than or equal to 100.25% $R_L$. Further, $R_U$ can be greater than or equal to 100.5% $R_L$, such as greater than or equal to 100.75% $R_L$, greater than or equal to 101.0% $R_L$, greater than or equal to 101.25% $R_L$, greater than or equal to 101.5% $R_L$, or greater than or equal to 101.75% $R_L$. In another aspect, $R_U$ can be less than or equal to 110.0% $R_L$, such as less than or equal to 107.5% $R_L$, less than or equal to 105.0% $R_L$, less than or equal to 102.5% $R_L$, or less than or equal to 102.0% $R_L$. It is to be understood that $R_U$ can be within a range between, and including, any of the maximum and minimum values of $R_U$ described herein. In this aspect, the diameter of the frustoconical bore 1920 can expand inward as the bore is traversed from the first end 1822 of the body 1820 of the back-up ring 1804 to the second end 1824 of the body 1820 of the back-up ring 1804.

When the back-up ring 1804 is installed within the spring energized seal 1802, as depicted in FIG. 18, the back-up ring 1804 can extend at least partially into the spring energized seal 1802. Specifically, the frustoconical extension 1828 of the body 1820 of the back-up ring 1804 can fit into the frustoconical bore 1890 formed in the body 1810 of the jacket 1808 of the spring energized seal 1802.

It can be appreciated that the shape of the back-up ring 1804 and the spring energized seal 1802 are adapted to allow the spring energized seal 1802 to flex longitudinally as a shaft installed therein reciprocates along the longitudinal axis 1806. The spring energized seal 1802 is adapted to allow the jacket 1808 to move with respect to the back-up ring 1804 as the shaft reciprocates. Specifically, the jacket 1808 and the spring 1856 can move slightly as the shaft reciprocates in the direction of travel with the shaft while maintaining the sealing portion of the jacket 1808 around the spring 1856 in proper contact with the shaft and a housing and maintaining the spring 1856 in proper alignment within the seal assembly 1800.

Figure 20:
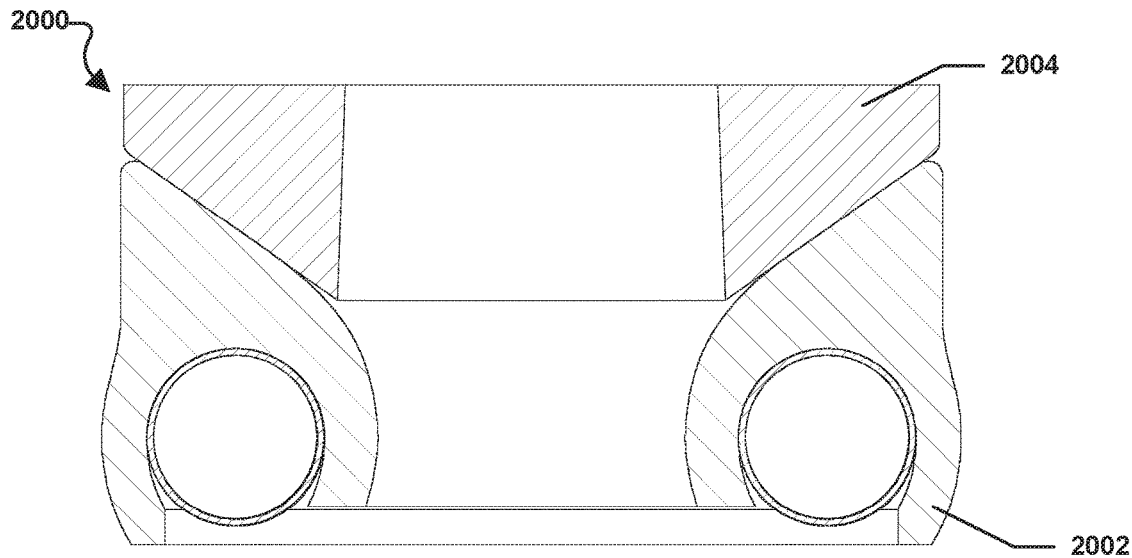
FIG. 20 includes an illustration of a cross-section view of yet another seal assembly in accordance with an embodiment.
Figure 21:
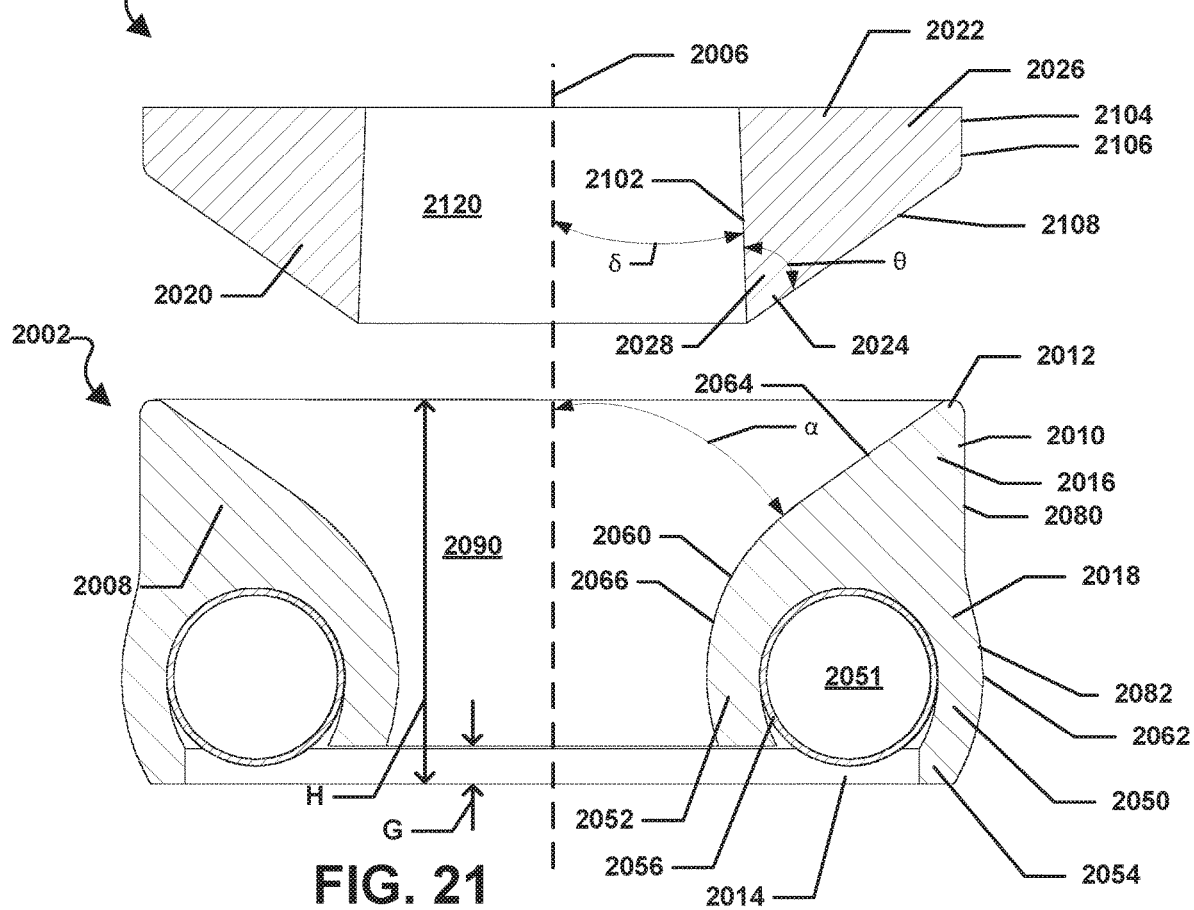
FIG. 21 includes an illustration of a cross-section and exploded view of the yet another seal assembly in accordance with an embodiment.

Referring to FIG. 20 and FIG. 21, another seal assembly is illustrated and is generally designated 2000. As shown, the seal assembly 2000 can include a spring energized seal 2002 and a back-up ring 2004. In a particular aspect, and as described in greater detail below, the back-up ring 2004 fits at least partially within the spring energized seal 2002. Moreover, the seal assembly 2000 can define a longitudinal axis 2006.

As shown in FIG. 20 and FIG. 21, the spring energized seal 2002 can include a jacket 2008 having a body 2010 and the body 2010 of the jacket 2008 can include a first end 2012 and a second end 2014. Further, the body 2010 can include a head 2016 that is formed on the body 2010 adjacent to, or near, the first end 2012 of the body 2010. Moreover, the body 2010 of the jacket 2008 can include an extension 2018 that can extend away from the head 2016 in a direction substantially parallel to the longitudinal axis 2006.

FIG. 20 and FIG. 21 also shows that the back-up ring 2004 can include a body 2020 that includes a first end 2022 and a second end 2024. The body 2020 can include a head 2026 that is formed on the body 2020 adjacent to, or near, the first end 2022 of the body 2020. Additionally, the body 2020 can include an extension 2028 that can extend away from the head 2026 in a direction substantially parallel to the longitudinal axis 2006. In a particular aspect, the extension 2028 of the back-up ring 2004 can be generally frustoconical in shape.

As illustrated in FIG. 20 and FIG. 21, the extension 2018 of the body 2010 of the spring energized seal 2002 can include a sealing portion 2050 formed at the second end 2014 of the body 2010. The sealing portion 2050 can include an inner extension portion 2052 and an outer extension portion 214. Further, the sealing portion 2050 can include an annular spring pocket 2051 formed between the inner extension portion 2052 and the outer extension portion 2054. The spring energized seal 2002 can further include an annular spring 2056 disposed within the annular spring pocket 2051.

In a particular aspect, the spring energized seal 2002 can have a gap, G, measured between the bottom of the inner extension portion 2052 and the bottom surface of the second end 2014 of the body 2010 of the jacket 2008 of the spring energized seal 2002. When compared to an overall height, H, of the spring energized seal 2002, G can be can be less than or equal to 25.0% H. Moreover, G can be less than or equal to 22.5% H, such as less than or equal to 20.0% H, less than or equal to 21.5% H, less than or equal to 15.0% H, less than or equal to 12.5% H, or less than or equal to 10.0% H. In another aspect, G can be greater than or equal to 2.5% H, such as greater than or equal to 5.0% H, greater than or equal to 7.5% H, greater than or equal to 8.0% H, greater than or equal to 8.5% H, greater than or equal to 9.0% H, or greater than or equal to 9.5% H. It is to be understood that G can be within a range between, and including, any of the maximum or minimum values of G described herein.

FIG. 20 and FIG. 21 further indicate that the body 110 of the spring energized seal 2002 can further include an interior surface 2060 and an exterior surface 2062. The interior surface 2060 can extend from the first end 2012 of the body 2010 to the second end of the body 2014 and can include a flat first portion 2064 that can extend generally downward and inward from the first end 2012 of the body 2010 of the jacket 2008 of the spring energized seal 2002. Moreover, the interior surface 2060 can include a curved second portion 2066 that can extend from the flat first portion 2064 and can terminate at the end of the inner extension portion 2052.

In a particular aspect, the flat second portion 2066 can be formed at an angle, $\alpha$, with respect to the longitudinal axis 2006. For example, $\alpha$ can be greater than or equal to 40°. Further, $\alpha$ can be greater than or equal to 45°, such as greater than or equal to 50°, greater than or equal to 55°. In another aspect, $\alpha$ can be less than or equal to 80°, such as less than or equal to 75°, less than or equal to 70°, less than or equal to 65°, or less than or equal to 60°. It is to be understood that $\alpha$ can be within a range between, and including, any of the minimum and maximum values of $\alpha$ described herein.

As further illustrated in FIG. 20 and FIG. 21, the exterior surface 2062 of the body 2010 of the jacket 2008 of the spring energized seal 2002 can include a flat first portion 2080 that can extend substantially parallel to the longitudinal axis 2006 of the spring assembly 2000. A curved second portion 2082 can extend generally downward from the first portion 2080 and can terminate at the second end 2014 of the body 2010 of the jacket 2008 of the spring energized seal 2002. As illustrated, a generally frustoconical bore 2090 can be formed within the body 2010 of the jacket 2008 of the spring energized seal 2002 and can be bound by the first portion 2064 of the interior surface 2060 of the body 2010 of the jacket 2008 of the spring energized seal 2002.

FIG. 20 and FIG. 21 further indicate that the body 2020 of the back-up ring 2004 can include an interior surface 2102 that can extend from the first end 2022 of the body 2020 to the second end 2024 of the body 2020. Further, the body 2020 of the back-up ring 2004 can include an exterior surface 2104 that can extend from the first end 2022 of the body 2020 to the second end 2024 of the body 2020. In a particular aspect, the interior surface 2102 of the body 2020 of the back-up ring 2004 can be formed at an angle, $\delta$, with respect to the longitudinal axis 2006. In a particular aspect, $\delta$ can be greater than or equal to 0.25°. Further, $\delta$ can be greater than or equal to 0.5°, such as greater than or equal to 0.75°, greater than or equal to 1.0°, greater than or equal to 1.5°, greater than or equal to 2.0°, greater than or equal to 2.5°, or greater than or equal to 3°. In another aspect, $\delta$ can be less than or equal to 10°, such as less than or equal to 7.5°, less than or equal to 5.0°, or less than or equal to 3.5°. It is to be understood that $\delta$ can be within a range between, and including, any of the minimum and maximum values of $\delta$ described herein.

As illustrated in FIG. 20 and FIG. 21, the exterior surface 2104 of the body 2020 of the back-up ring 2004 can include a flat first portion 2106 that is substantially parallel to the longitudinal axis 2006 of the spring assembly 2000. A flat second portion 2108 can extend generally downward and inward from the flat first portion 2106 at an angle with respect to the flat first portion. The flat second portion 2108 can terminate at the second end 2024 of the body 2020 of the back-up ring 2004.

As depicted in FIG. 20 and FIG. 21, the interior surface 2102 of the body 2020 of the back-up ring 2004 can form an angle, θ, with respect to the flat third portion 2110 of the exterior surface 2104 of the body 2020 of the back-up ring 2004. In particular, θ can be can be greater than or equal to 30°. Further, θ can be greater than or equal to 35°, such as greater than or equal to 40°, greater than or equal to 45°, greater than or equal to 50°, greater than or equal to 55°. In another aspect, θ can be less than or equal to 80°, such as less than or equal to 75°, less than or equal to 70°, less than or equal to 65°, or less than or equal to 60°. It is to be understood that θ can be within a range between, and including, any of the minimum and maximum values of θ described herein.

FIG. 20 and FIG. 21 show that a frustoconical bore 2120 can be formed within the body 2020 of the back-up ring 2004. The frustoconical bore 2120 within the body 2020 of the back-up ring 2004 can be bound by the interior surface 2102 of the body 2020 of the back-up ring 2004. The frustoconical bore 2120 can have an upper radius, $R_U$, measured at the first end 2022 of the back-up ring 2004 and a lower radius, $R_L$, measured at the second end 2024 of the back-up ring 2004. In a particular aspect, $R_U$ can be less than $R_L$. In particular, $R_U$ can be less than or equal to 99.75% $R_L$. Further, $R_U$ can be less than or equal to 99.5% $R_L$, such as less than or equal to 99.25% $R_L$, less than or equal to 99.0% $R_L$, less than or equal to 98.75% $R_L$, less than or equal to 98.5% $R_L$, or less than or equal to 98.25% $R_L$. In another aspect, $R_U$ can be greater than or equal to 90.0% $R_L$, such as greater than or equal to 92.5% $R_L$, greater than or equal to 95.0% $R_L$, greater than or equal to 97.5% $R_L$, or greater than or equal to 98.0% $R_L$. It is to be understood that $R_U$ can be within a range between, and including, any of the maximum and minimum values of $R_U$ described herein. As shown, the diameter of the frustoconical bore 2120 can expand outward as the bore is traversed from the first end 2022 of the body 2020 of the back-up ring 2004 to the second end 2024 of the body 2020 of the back-up ring 2004.

In another aspect, $R_U$ can be greater than $R_L$. In particular, $R_U$ can be greater than or equal to 100.25% $R_L$. Further, $R_U$ can be greater than or equal to 100.5% $R_L$, such as greater than or equal to 100.75% $R_L$, greater than or equal to 101.0% $R_L$, greater than or equal to 101.25% $R_L$, greater than or equal to 101.5% $R_L$, or greater than or equal to 101.75% $R_L$. In another aspect, $R_U$ can be less than or equal to 110.0% $R_L$, such as less than or equal to 107.5% $R_L$, less than or equal to 105.0% $R_L$, less than or equal to 102.5% $R_L$, or less than or equal to 102.0% $R_L$. It is to be understood that $R_U$ can be within a range between, and including, any of the maximum and minimum values of $R_U$ described herein. In this aspect, the diameter of the frustoconical bore 2120 can expand inward as the bore is traversed from the first end 2022 of the body 2020 of the back-up ring 2004 to the second end 2024 of the body 2020 of the back-up ring 2004.

When the back-up ring 2004 is installed within the spring energized seal 2002, as depicted in FIG. 20, the back-up ring 2004 can extend at least partially into the spring energized seal 2002. Specifically, the frustoconical extension 2028 of the body 2020 of the back-up ring 2004 can fit into the frustoconical bore 2090 formed in the body 2010 of the jacket 2008 of the spring energized seal 2002.

It can be appreciated that the shape of the back-up ring 2004 and the spring energized seal 2002 are adapted to allow the spring energized seal 2002 to flex longitudinally as a shaft installed therein reciprocates along the longitudinal axis 2006. The spring energized seal 2002 is adapted to allow the jacket 2008 to move with respect to the back-up ring 2004 as the shaft reciprocates. Specifically, the jacket 2008 and the spring 2056 can move slightly as the shaft reciprocates in the direction of travel with the shaft while maintaining the sealing portion of the jacket 2008 around the spring 2056 in proper contact with the shaft and a housing and maintaining the spring 2056 in proper alignment within the seal assembly 2000.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the items as listed below.

EMBODIMENTS

Embodiment 1

A seal assembly for a high pressure pump, comprising:
a back-up ring having a head and an extension extending from the head, wherein the extension includes an interior surface that extends axially away from and radially inwardly from the head; and
a spring energized seal having a jacket having a sealing portion with an annular spring disposed within the sealing portion of the jacket, wherein at least a portion of the jacket fits around the extension of the back-up ring and wherein the back-up ring has a minimum inner diameter, $ID_{BUR}$, the spring energized seal has a minimum inner diameter, $ID_{SES}$, and $ID_{SES}$ is less than $ID_{BUR}$.

Embodiment 2

A seal assembly for a high pressure pump, comprising:
a back-up ring having a head and an extension extending from the head;
a spring energized seal at least partially disposed around the extension of the back-up ring, the spring energized seal comprising a jacket having a head formed at a first end, a sealing portion formed at a second end spaced apart from the first end, an angled internal surface extending between the first end of the jacket and the second end of the jacket; and an annular spring disposed within the sealing portion of the jacket; and
a gap between the extension of the back-up ring and the angled internal surface of the jacket of the spring energized seal, wherein the gap extends at least partially along the length of the angled internal surface of the jacket of the spring energized seal.

Embodiment 3

A seal assembly for a high pressure pump, comprising:
a spring energized seal comprising:
a jacket having a head formed at a first end of the jacket, an annular lip extending axially from the head of the jacket, and a sealing portion formed at a second end of the jacket at a distance from the first end, wherein the sealing portion includes a spring portion; and an annular spring disposed within the spring portion;

a back-up ring having a head formed at a first end of the back-up ring and an extension extending from the head of the back-up ring; and a first gap circumscribing the head of the back-up ring between an exterior surface of the head of the back-up ring and an interior surface of the annular lip of the head of the jacket.

Embodiment 4

The seal assembly of embodiment 1, wherein $ID_{SES}$ is less than or equal to 99% $ID_{BUR}$.

Embodiment 5

The seal assembly of embodiment 4, wherein $ID_{SES}$ is less than or equal to 98% $ID_{BUR}$, such as less than or equal to 97% $ID_{BUR}$, less than or equal to 96% $ID_{BUR}$, or less than or equal to 95% $ID_{BUR}$.

Embodiment 6

The seal assembly of embodiment 5, wherein $ID_{SES}$ is greater than or equal to 85% $ID_{BUR}$, such as greater than or equal to 90% $ID_{BUR}$, greater than or equal to 91% $ID_{BUR}$, greater than or equal to 92% $ID_{BUR}$, greater than or equal to 93% $ID_{BUR}$, or greater than or equal to 94% $ID_{BUR}$.

Embodiment 7

The seal assembly of any of embodiments 1, 2, and 3, wherein the sealing portion of the spring energized seal is adapted to contact a shaft disposed within the seal assembly and a housing in which the seal assembly is installed.

Embodiment 8

The seal assembly of embodiment 3, wherein the first gap has a radial width, $W_{FG}$, and the seal assembly has an outer diameter outer diameter, $OD_{SA}$, and $W_{FG}$ is less than or equal to 5% $OD_{SA}$.

Embodiment 9

The seal assembly of embodiment 8, wherein $W_{FG}$ is less than or equal to 4% $OD_{SA}$, such as less than or equal to 3% $OD_{SA}$, less than or equal to 2% $OD_{SA}$, or less than or equal to 1% $OD_{SA}$.

Embodiment 10

The seal assembly of embodiment 9, wherein $W_{FG}$ is greater than or equal to 0.1% $OD_{SA}$, such as greater than or equal to 0.2% $OD_{SA}$, greater than or equal to 0.3% $OD_{SA}$, greater than or equal to 0.4% $OD_{SA}$, greater than or equal to 0.5% $OD_{SA}$, greater than or equal to 0.6% $OD_{SA}$, greater than or equal to 0.7% $OD_{SA}$, greater than or equal to 0.8% $OD_{SA}$, or greater than or equal to 0.9% $OD_{SA}$.

Embodiment 11

The seal assembly of embodiment 3, wherein the first gap has a radial width, $W_{FG}$, and $W_{FG}$ is less than or equal to 0.1 mm.

Embodiment 12

The seal assembly of embodiment 11, wherein $W_{FG}$ is less than or equal to 0.095 mm, such as less than or equal to 0.09 mm, less than or equal to 0.085 mm, less than or equal to 0.08 mm, less than or equal to 0.075 mm, less than or equal to 0.07 mm, less than or equal to 0.065 mm, or less than or equal to 0.06 mm.

Embodiment 13

The seal assembly of embodiment 12, wherein $W_{FG}$ is greater than or equal to 0.01 mm, such as greater than or equal to 0.015 mm, greater than or equal to 0.02 mm, greater than or equal to 0.025 mm, greater than or equal to 0.03 mm, greater than or equal to 0.035 mm, greater than or equal to 0.04 mm, greater than or equal to 0.045 mm, or greater than or equal to 0.05 mm.

Embodiment 14

The seal assembly of embodiment 1, wherein the interior surface of the back-up ring forms an angle, $\gamma$, with respect to a longitudinal axis and $\gamma$ is greater than or equal to 0.25°.

Embodiment 15

The seal assembly of embodiment 14, wherein $\gamma$ is greater than or equal to 0.5°, such as greater than or equal to 0.75°, greater than or equal to 1.0°, greater than or equal to 1.5°, greater than or equal to 2.0°, greater than or equal to 2.5°, or greater than or equal to 3°.

Embodiment 16

The seal assembly of embodiment 15, wherein $\gamma$ is less than or equal to 10°, such as less than or equal to 7.5°, less than or equal to 5.0°, or less than or equal to 3.5°.

Embodiment 17

The seal assembly of any of embodiments 2 and 3, wherein the head of the back-up ring includes a lower surface and the head of the jacket includes an upper surface in contact with the lower surface of the head of the back-up ring.

Embodiment 18

The seal assembly of embodiment 17, wherein the head of the back-up ring has a maximum radial width, $W_{BUR}$, and the lower surface of the head of the back-up ring has a radial width, $W_{LS}$, and $W_{ES}$ is less than $W_{BUR}$.

Embodiment 19

The seal assembly of embodiment 18, wherein $W_{LS}$ is less than or equal to 80% $W_{BUR}$.

Embodiment 20

The seal assembly of embodiment 19, wherein $W_{LS}$ is less than or equal to 75% $W_{BUR}$, such as less than or equal to 70% $W_{BUR}$, less than or equal to 65% $W_{BUR}$, or less than or equal to 60% $W_{BUR}$.

Embodiment 21

The seal assembly of embodiment 20, wherein $W_{LS}$ is greater than or equal to 30% $W_{BUR}$, such as greater than or equal to 35% $W_{BUR}$, greater than or equal to 40% $W_{BUR}$, greater than or equal to 45% $W_{BUR}$, or greater than or equal to 50% $W_{BUR}$.

Embodiment 22

The seal assembly of any of embodiments 2 and 3, wherein the sealing portion of the jacket of spring energized seal is adapted to contact a shaft installed within the seal assembly and a second gap is formed between the extension of the back-up ring and the jacket.

Embodiment 23

The seal assembly of embodiment 2, wherein the second gap has a length, $L_{SG}$, and the exterior surface of the extension of the back-up ring has a length, $L_{ES}$, and $L_{SG}$ is less than or equal to 100% $L_{ES}$.

Embodiment 24

The seal assembly of embodiment 23, wherein $L_{SG}$ is less than or equal to 95% $L_{ES}$, such as less than or equal to 90% $L_{ES}$, less than or equal to 85% $L_{ES}$, less than or equal to 80% $L_{ES}$, or less than or equal to 75% $L_{ES}$.

Embodiment 25

The seal assembly of embodiment 24, wherein $L_{SG}$ is greater than or equal to 10% $L_{ES}$, such as greater than or equal to 15% $L_{ES}$, greater than or equal to 20% $L_{ES}$, greater than or equal to 25% $L_{ES}$, greater than or equal to 30% $L_{ES}$, greater than or equal to 35% $L_{ES}$, greater than or equal to 40% $L_{ES}$, greater than or equal to 45% $L_{ES}$, or greater than or equal to 50% $L_{ES}$.

Embodiment 26

The seal assembly of embodiment 3, wherein the first gap is adapted to allow the back-up ring to move in any radial direction relative to the spring energized seal.

Embodiment 27

The seal assembly of any of embodiments 1, 2, and 3, wherein the back-up ring comprises a polymer.

Embodiment 28

The seal assembly of embodiment 27, wherein the back-up ring comprises a polyaryletherketone (PAEK).

Embodiment 29

The seal assembly of embodiment 28, wherein the back-up ring comprises polyether ether ketone (PEEK).

Embodiment 30

The seal assembly of any of embodiments 1, 2, and 3, wherein the jacket of the spring energized seal comprises a fluoropolymer.

Embodiment 31

The seal assembly of embodiment 30, wherein the jacket of the spring energized seal comprises a fluoropolymer of tetrafluoroethylene.

Embodiment 32

The seal assembly of embodiment 31, wherein the jacket of the spring energized seal comprises polytetrafluoroethylene (PTFE).

Embodiment 33

The seal assembly of any of embodiments 1, 2 and 3, wherein the seal assembly is adapted to withstand a pressure of greater than or equal to 5,000 psi.

Embodiment 34

The seal assembly of embodiment 33, wherein the pressure is greater than or equal to 7,500 psi, such as greater than or equal to 10,000 psi, greater than or equal to 12,500 psi, or greater than or equal to 15,000 psi.

Embodiment 35

The seal assembly of embodiment 34, wherein the pressure is less than or equal to 30,000 psi, such as less than or equal to 27,500 psi, less than or equal to 25,000 psi, less than or equal to 22,500 psi, or less than or equal to 20,000 psi.

Embodiment 36

The seal assembly of embodiment 22, further comprising a third gap established between the jacket and a housing in which the seal assembly is configured to be installed.

Embodiment 37

The seal assembly of embodiment 36, wherein the third gap comprises a maximum gap width, $W_{TG}$, and $W_{TG}$ is less than or equal to 0.5 mm, such as less than or equal to 0.45 mm, less than or equal to 0.4 mm, less than or equal to 0.35 mm, less than or equal to 0.3 mm, less than or equal to 0.25 mm, less than or equal to 0.2 mm, less than or equal to 0.15 mm, less than or equal to 0.1 mm, or less than or equal to 0.05 mm.

Embodiment 38

The seal assembly of embodiment 37, wherein $W_{TG}$ is greater than or equal to 0.01 mm, such as greater than or equal to 0.015 mm, greater than or equal to 0.02 mm, greater than or equal to 0.025 mm, greater than or equal to 0.03 mm, greater than or equal to 0.035 mm, greater than or equal to 0.04 mm, greater than or equal to 0.045 mm, or greater than or equal to 0.05 mm.

Embodiment 39

The seal assembly of embodiment 36, further comprising a fourth gap established between the head of the back-up ring and the housing.

Embodiment 40

The seal assembly of embodiment 39, wherein the fourth gap comprises gap width, $W_{FOG}$, measured radially through the fourth gap and $W_{FOG}$ is be less than or equal to 0.1 mm, such as less than or equal to 0.095 mm, less than or equal to 0.09 mm, less than or equal to 0.085 mm, less than or equal to 0.08 mm, less than or equal to 0.075 mm, less than or equal to 0.07 mm, less than or equal to 0.065 mm, or less than or equal to 0.06 mm.

Embodiment 41

The seal assembly of embodiment 40, wherein $W_{FOG}$ is greater than or equal to 0.01 mm, such as greater than or equal to 0.015 mm, greater than or equal to 0.02 mm, greater than or equal to 0.025 mm, greater than or equal to 0.03 mm, greater than or equal to 0.035 mm, greater than or equal to 0.04 mm, greater than or equal to 0.045 mm, or greater than or equal to 0.05 mm.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive. Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application.

As used herein, the terms "comprises," "comprising," "includes," "including," "has," "having" or any other variation thereof, are intended to cover a non-exclusive inclusion. For example, α method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, α condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in reference books and other sources within the structural arts and corresponding manufacturing arts.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A seal assembly for a high pressure pump, comprising:
   a back-up ring having a body comprising a head and an extension extending from the head, wherein the extension includes an interior surface that extends axially away from and radially inwardly from the head; and
   a spring energized seal having a jacket having a sealing portion with an annular spring disposed within the sealing portion of the jacket, wherein the annular spring is not directly adjacent to the back-up ring, wherein at least a portion of the jacket fits around the extension of the back-up ring, wherein the jacket comprises an interior surface having an inwardly curved convex portion toward a longitudinal axis.

2. The seal assembly of claim 1, wherein $ID_{SES}$ is less than or equal to 99% $ID_{BUR}$.

3. The seal assembly of claim 2, wherein $ID_{SES}$ is greater than or equal to 85% $ID_{BUR}$.

4. The seal assembly of claim 1, wherein the sealing portion of the spring energized seal is adapted to contact a shaft disposed within the seal assembly and a housing in which the seal assembly is installed.

5. The seal assembly of claim 1, wherein the interior surface of the back-up ring forms an angle, y, with respect to the longitudinal axis and y is greater than or equal to 0.25°.

6. The seal assembly or claim 5, wherein γ is less man or equal to 5°.

7. A seal assembly for a high pressure pump, comprising:
   a back-up ring having a body comprising a head and an extension extending from the head;
   a spring energized seal at least partially disposed around the extension of the back-up ring, the spring energized seal comprising a jacket having a head formed at a first end, a sealing portion formed at a second end spaced apart from the first end, an angled internal surface extending between the first end of the jacket and the second end of the jacket; and an annular spring disposed within the sealing portion of the jacket, wherein the annular spring is not directly adjacent to the back-up ring; and
   a gap between the extension of the back-up ring and the angled internal surface of the jacket of the spring energized seal, wherein the gap extends at least partially along the length of the angled internal surface of the jacket of the spring energized seal.

8. The seal assembly of claim 7, wherein the head of the back-up ring includes a lower surface and the head of the jacket includes an upper surface in contact with the lower surface of the head of the back-up ring.

9. The seal assembly of claim 8, wherein the head of the back-up ring has a maximum radial width, $W_{BUR}$, and the lower surface of the head of the back-up ring has a radial width, $W_{LS}$, and $W_{LS}$ is less than $W_{BUR}$.

10. The seal assembly of claim 9, wherein the seal assembly is adapted to withstand a pressure of greater than or equal to 5,000 psi.

11. The seal assembly of claim 7, wherein the back-up ring comprises a polymer.

12. The seal assembly of claim 7, wherein the jacket of the spring energized seal comprises a fluoropolymer.

13. A seal assembly for a high pressure pump, comprising:
a spring energized seal comprising:
a jacket having a head formed at a first end of the jacket, an annular lip extending axially from the head of the jacket, and a sealing portion formed at a second end of the jacket at a distance from the first end, wherein the sealing portion includes a spring portion; and
an annular spring disposed within the spring portion;
a back-up ring having a body comprising a head formed at a first end of the back-up ring and an extension extending from the head of the back-up ring; and
a first gap circumscribing the head of the back-up ring between an exterior surface of the head of the back-up ring and an interior surface of the annular lip of the jacket, wherein the annular spring is not directly adjacent to the back-up ring, wherein the first gap is perpendicular to a longitudinal axis.

14. The seal assembly or claim 13, wherein the tirst gap has a radial width, $W_{FG}$, and the seal assembly has an outer diameter, $OD_{SA}$, and $W_{FG}$ is less than or equal to 5% $OD_{SA}$.

15. The seal assembly of claim 13, wherein the first gap has a radial width, $W_{FG}$, and $W_{FG}$ is less than or equal to 0.1 mm.

16. The seal assembly of claim 13, wherein the sealing portion of the jacket of spring energized seal is adapted to contact a shaft installed within the seal assembly and a second gap is formed between the extension of the back-up ring and the jacket.

17. The seal assembly of claim 16, wherein the second gap has a length, $L_{SG}$, and an exterior surface of the extension of the back-up ring has a length, $L_{ES}$, and $L_{SG}$ is less than or equal to 100% $L_{ES}$.

18. The seal assembly of claim 13, wherein the first gap is adapted to allow the back-up ring to move in any radial direction relative to the spring energized seal.

19. The seal assembly of claim 16, further comprising a third gap established between the jacket and a housing in which the seal assembly is configured to be installed.

20. The seal assembly of claim 19, further comprising a fourth gap established between the head of the back-up ring and the housing.

* * * * *